United States Patent
Nakata et al.

(10) Patent No.: US 7,894,678 B2
(45) Date of Patent: Feb. 22, 2011

(54) RADIO COMMUNICATION DEVICE, RADIO COMMUNICATION SYSTEM, WIRELESS AV SYSTEM, RADIO TRANSMISSION METHOD, OPERATION CONTROL PROGRAM, AND RECORDING MEDIUM CONTAINING THE PROGRAM

(75) Inventors: Masashi Nakata, Yaita (JP); Takafumi Chishiro, Yaita (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 1497 days.

(21) Appl. No.: 10/557,181

(22) PCT Filed: Apr. 19, 2004

(86) PCT No.: PCT/JP2004/005587

§ 371 (c)(1),
(2), (4) Date: Nov. 17, 2005

(87) PCT Pub. No.: WO2004/105298

PCT Pub. Date: Dec. 2, 2004

(65) Prior Publication Data

US 2006/0258291 A1 Nov. 16, 2006

(30) Foreign Application Priority Data

May 21, 2003 (JP) .............................. 2003-143837
Apr. 9, 2004 (JP) .............................. 2004-116186

(51) Int. Cl.
*G06K 9/36* (2006.01)
(52) U.S. Cl. .................................. 382/232; 375/240.27
(58) Field of Classification Search ......... 382/232–252; 375/240.02–240.29; 714/716, 717
See application file for complete search history.

(56) References Cited

U.S. PATENT DOCUMENTS

| 6,993,689 B2 * | 1/2006 | Nagai et al. ................. 714/717 |
| 2002/0053053 A1 | 5/2002 | Nagai et al. |
| 2002/0131449 A1 | 9/2002 | Sugisaki |
| 2002/0181637 A1 | 12/2002 | Nakabayashi |
| 2003/0072266 A1 | 4/2003 | Uesugi et al. |
| 2005/0257111 A1 | 11/2005 | Nagai et al. |

(Continued)

FOREIGN PATENT DOCUMENTS

JP 7-283757 A 10/1995

(Continued)

*Primary Examiner*—Duy M Dang
(74) *Attorney, Agent, or Firm*—Birch, Stewart, Kolasch & Birch, LLP

(57) ABSTRACT

A radio communication system according to the present invention includes a video/audio transmitter (1) and a video/audio receiver (2) for transmission/reception of data including video data and audio data at a predetermined bit rate. The video/audio receiver (2) has an error information generation section (18) for detecting a communication state according to a signal from the video/audio transmitter (1). The video/audio transmitter (1) has a transmission section (6) for transmitting data while controlling to change the bit rate according to the communication state detected by the video/audio receiver (2). Unless the communication state satisfies a predetermined criterion, the transmission section (6) temporarily lowers the bit rate for transmitting the data to the video/audio receiver (2). Thus, even when the communication state deteriorates, it is possible to minimize deterioration of the video and audio data and transmit data without lowering the quality of the entire video and audio transmitted.

8 Claims, 12 Drawing Sheets

U.S. PATENT DOCUMENTS

| | | |
|---|---|---|
| 2006/0015783 A1 | 1/2006 | Nagai et al. |
| 2006/0085725 A1 | 4/2006 | Nagai et al. |
| 2007/0223449 A1 | 9/2007 | Nagai et al. |
| 2007/0223503 A1 | 9/2007 | Nagai et al. |
| 2007/0223583 A1 | 9/2007 | Nagai et al. |
| 2007/0223584 A1 | 9/2007 | Nagai et al. |
| 2007/0223586 A1 | 9/2007 | Nagai et al. |

FOREIGN PATENT DOCUMENTS

| | | |
|---|---|---|
| JP | 9-98176 A | 4/1997 |
| JP | 10-56479 A | 2/1998 |
| JP | 2002-51003 A | 2/2002 |
| JP | 2002-204278 A | 7/2002 |
| JP | 2002-271303 A | 9/2002 |
| JP | 2003-51781 A | 2/2003 |

* cited by examiner

FIG. 7

○ EXAMPLES OF MPEG RATE

| SETTING VALUE | MPEG RATE (MBPS) | MAXIMUM NUMBER OF TIMES OF RETRANSMISSION | SETTING VALUE | MPEG RATE (MBPS) | MAXIMUM NUMBER OF TIMES OF RETRANSMISSION | |
|---|---|---|---|---|---|---|
| | | | 0x10 | 6.53 | 3 | |
| | | | 0x11 | 6.67 | 3 | |
| | | | 0x12 | 6.78 | 2 | |
| 0x03 | 2.13 | 31 | 0x13 | 6.89 | 2 | ← d. |
| 0x04 | 2.87 | 20 | 0x14 | 7.00 | 2 | |
| 0x05 | 3.48 | 15 | 0x15 | 7.09 | 2 | |
| 0x06 | 3.99 | 11 | 0x16 | 7.18 | 2 | ← b. |
| 0x07 | 4.42 | 9 | 0x17 | 7.26 | 1 | ← f. |
| 0x08 | 4.79 | 8 | 0x18 | 7.34 | 1 | |
| 0x09 | 5.11 | 7 | 0x19 | 7.41 | 1 | |
| 0x0A | 5.39 | 6 | 0x1A | 7.48 | 1 | |
| 0x0B | 5.63 | 5 | 0x1B | 7.54 | 1 | |
| 0x0C | 5.85 | 4 | 0x1C | 7.60 | 1 | ← c. |
| 0x0D | 6.05 | 4 | 0x1D | 7.66 | 1 | |
| 0x0E | 6.22 | 3 | 0x1E | 7.71 | 1 | |
| 0x0F | 6.39 | 3 | 0x1F | 7.76 | 1 | |
| | | | 0x20 | 7.81 | 1 | ← e. |
| | | | 0x21 | 7.86 | 1 | ← a. |

(Note: arrows d. and c. point to rows 0x03 and 0x0C in the left portion of the table.)

RADIO COMMUNICATION DEVICE, RADIO COMMUNICATION SYSTEM, WIRELESS AV SYSTEM, RADIO TRANSMISSION METHOD, OPERATION CONTROL PROGRAM, AND RECORDING MEDIUM CONTAINING THE PROGRAM

TECHNICAL FIELD

The present invention relates to a radio communication device, a radio communication system, a wireless AV system, a radio transmission method, an operation control program, and a recording medium containing the program.

BACKGROUND ART

In recent years, as the Internet has come explosively into wide use, cases of establishing LAN (Local Area Network) in offices and homes have increased. With the aid of progress in digital radio communication technology, and due to inconveniences of cable wiring, so called wireless LANs, which establish a LAN wirelessly are greatly required. Moreover, with the aid of the fact that the wireless LAN can be used in mobile environments by mobile terminals typified by portable computers, it is expected that wireless LANs will be used in large numbers in the future.

An example of the wireless LAN technology includes IEEE802.11 which is already standardized in IEEE(Institute of Electrical and Electronics Engineers). The standardized technology defines an OSI model, from a physical layer to a MAC (Media Access Control) layer which is a lower layer of a data link, can displace the Ethernet (registered trade mark) which is a wire LAN transmission line, and has further a specification which can also provide a roaming function which is an additional function by virtue of being wireless.

Moreover, domestic use of radio transmission apparatus has increased. There are more and more occasions in which even a video signal system, such as video and audio, is digitized and wirelessly transmitted from a fixed transmitter to a mobile receiver, for viewing and listening. Meanwhile, a limited frequency band available without license causes increase in mutual interference between radio apparatuses or between apparatuses which emit electromagnetic waves. Therefore, when manufacturing a radio apparatus, it is important how the interference caused by another radio apparatus or electromagnetic wave emitting apparatus is dealt with.

As an example of measures to be taken to deal with interference, an audio data communication device is disclosed in Patent Document 1.

(Patent Document 1)

Japanese Unexamined Patent Publication No. 7-283757/1995 (Tokukaihei 7-283757; published on Oct. 27, 1995). With this audio data communication device with which it is possible to minimize reception data loss rate due to data error, even when noise in the reception environment increases, by variable bit rate compression of audio.

FIG. 12 illustrates an arrangement of the audio data communication device disclosed in Patent Document 1.

In FIG. 12, an audio data transmission device 200 transmits audio data which an audio data reception device 201A receives. In the audio data reception device 201A, a CRC (Cyclic Redundancy Check) bit judgment device 201E detects an error in the received data. According to an error rate judged by an error rate judgment device 201F, retransmission instruction message generator 201G generates a message which specifies a data compression rate and a number of times of retransmission at a transmission end. The message is transmitted to the audio data transmission device 200. According to the message, a coder 213 compresses data to the specified data compression rate. A CRC bit generation device 214 adds a CRC bit to the compressed data so as to generate a compression data packet, and stores it in a data buffer. Meanwhile, a retransmission counter 216 counts the number of times specified by the message. The compression data packets are read out of the data buffer 215 by the counted number of times, aligned in one frame, and transmitted from a transmitter 219.

However, in such a conventional radio communication apparatus, it is supposed that a variable bit rate compression method is used. This requires changing, according to an error rate, the compression rate and the number of times of retransmission for each data packet transmission. Therefore, if the communication state deteriorates, it becomes difficult to maintain a constant data quality. This results in a lowered quality of the entire video-or audio to be transmitted.

The present invention is to solve the above mentioned problems and an object of the present invention is to provide a radio communication device with which it is possible to minimize deterioration of the video and audio data, even when the communication state deteriorates, and to transmit data without lowering the quality of the entire video and audio transmitted.

DISCLOSURE OF INVENTION

To attain the object, in accordance with the present invention; a radio communication device for transmission of data including video data and audio data at a predetermined bit rate comprises a communication state detection section for detecting a communication state, according to a signal from a sender; and a data transmission section for transmitting the data while controlling to change the bit rate according to the communication state detected by the communication state detection section, wherein unless the communication state satisfies a predetermined criterion, the data transmission section temporarily lowers the bit rate for transmitting the data.

Here, the communication state not satisfying a predetermined criterion refers to a communication state in which, in the case of video data, a quality of the video data deteriorates to a level at which a large majority of users can not bear to watch the video, and in the case of audio data, a quality of the audio data deteriorates to a level at which a large majority of users can not bear to listen to the audio.

Moreover, when the bit rate is lowered, the quality of video and audio is reduced. However, the bit rate is lowered only to a level at which the communication state of the video and audio still satisfies the predetermined criterion.

In this manner, unless the detected communication state satisfies a predetermined criterion, the data transmission section temporarily lowers the bit rate for transmitting the data. This makes it possible to minimize deterioration of the video and audio data.

Thus, even when the communication state deteriorates, the deterioration of the video and audio data is minimized. Accordingly, it is possible to perform the data transmission without lowering the quality of the entire video and audio transmitted.

Moreover, during the transmission at a lower bit rate, if the communication state detection section detects that the communication sate satisfies a predetermined criterion, the bit rate may be increased to a predetermined level for transmitting the data.

Thus, it is possible to minimize a time period in which the video and audio data is deteriorated. In this case, the predetermined criterion can be a criterion for increasing a bit rate to a bit rate at the start of communication, a criterion for increasing a bit rate to a lower bit rate than a bit rate at the start of communication, or a criterion for increasing a bit rate to a higher bit rate than a bit rate at the start of communication.

Moreover, the radio communication device may further comprise a setting value storing section for storing setting values which are respectively associated with bit rates and numbers of times of retransmission of data, the data transmission section selecting, based on the detected communication state, a setting value stored in the setting value storing section, and transmitting the data at the bit rate and the number of times of retransmission corresponding to the selected setting value.

In this case, even when an error rate in data transmission is high, such as when the communication state is very deteriorated, data communication is possible with a lowered bit rate and an increased number of times of retransmission of data. That is, a bit rate and a number of times of retransmission of data for data transmission can be set according to the level of the communication state. This makes it possible to improve error tolerance.

The video and audio data can be transmitted as an MPEG stream complying with an MPEG coding system.

In order to achieve the foregoing object, in accordance with the present invention, a radio communication system includes a transmitter and a receiver for transmission/reception of data including video data and audio data at a predetermined bit rate, the receiver comprising:

an error judgment section for judging an error in data received from the transmitter; and an error information transmission section for transmitting the error judged by the error judgment means as error information to the transmitter, and the transmitter comprising:

a communication state detection section for detecting a communication state according to the error information transmitted from the receiver; and a data transmission section for temporarily lowering the bit rate for transmitting the data to the receiver, unless the communication state detected by the communication state detection section satisfies a predetermined criterion.

According to the arrangement above, it is possible to realize a system which can minimize deterioration of the video and audio data and transmit data without lowering the quality of the entire video and audio transmitted, even when the communication state deteriorates.

Moreover, the application of the radio communication device to a wireless AV system for connection using plural networks realizes a wireless AV system in which deterioration of the video and audio data is minimized.

Further objects, characteristics, and advantages of the present invention will be fully understood from the descriptions below. Moreover, benefits of the present invention will be clearly described below with reference to the accompanying drawings.

BRIEF DESCRIPTION OF DRAWINGS

FIG. 7 illustrates an example of associations between bit rates and maximum numbers of times of retransmission, which is referred to for video/audio data transmission performed by the radio communication device according to the second embodiment.

BEST MODE FOR CARRYING OUT THE INVENTION

Embodiments

With reference to the accompanying drawings, radio communication devices according to preferred embodiments of the present invention will be fully explained as follows.

Embodiment 1

Figure 1:
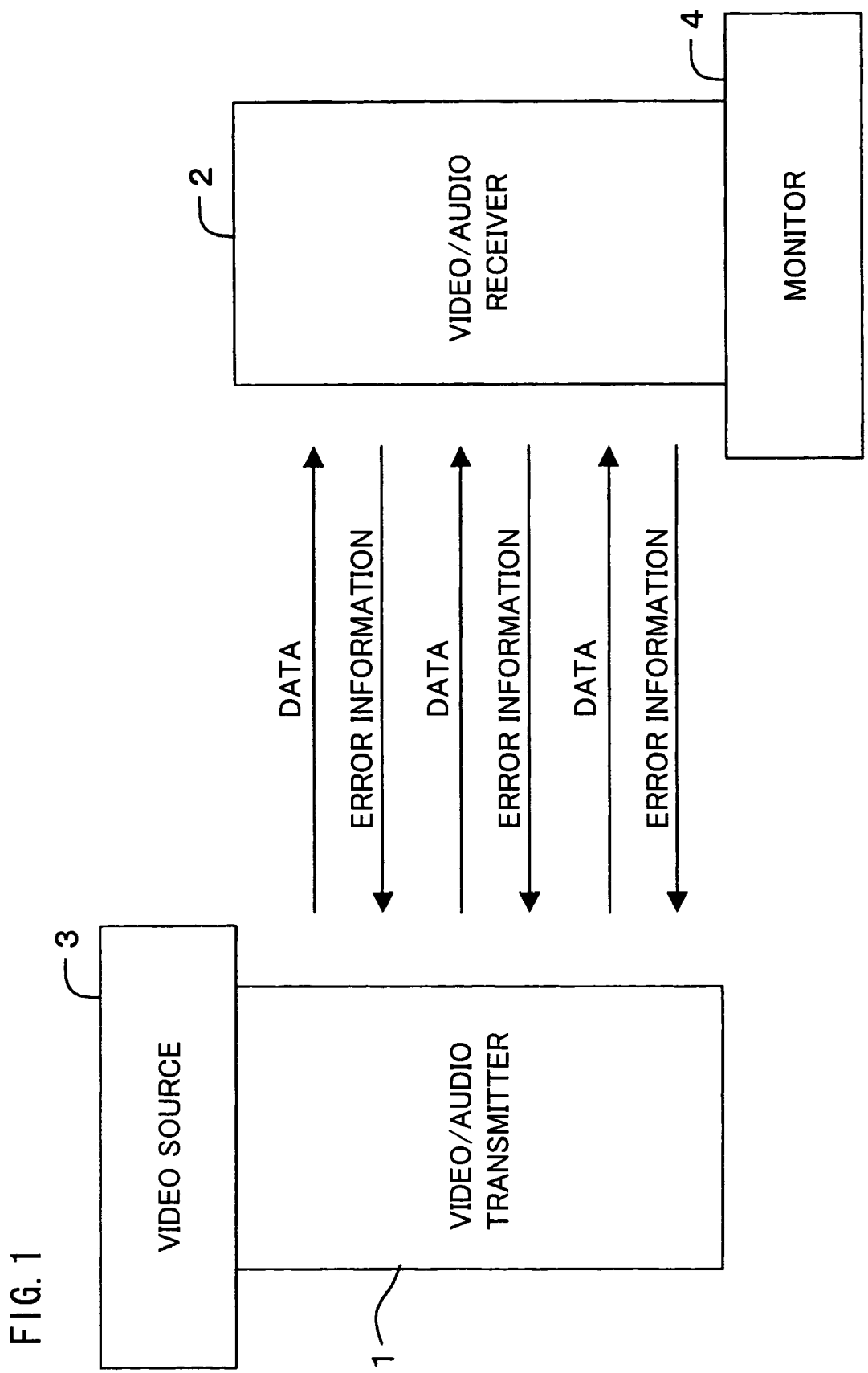
FIG. 1 illustrates an overview of an operation of a radio communication device according to a first embodiment of the present invention.

An embodiment of the present invention is explained in the following. FIG. 1 illustrates an overview of an operation of a radio communication device according to a first embodiment of the present invention.

As illustrated in FIG. 1, the radio communication device according to the present embodiment is arranged to comprise: a video/audio transmitter 1 for transmitting video/audio data; a video/audio receiver 2 for receiving the video/audio data transmitted from the video/audio transmitter 1; a video source 3 for providing video/audio data to be transmitted to the video/audio transmitter 1; and a monitor 4 for outputting the transmitted video/audio data.

For video/audio wireless transmission, the video/audio transmitter 1 digitizes an incoming video signal if the incoming video signal is analog, codes the video signal, sends the coded video/audio data to a receiver end, receives various error information from the receiver end, and determines a bit rate and a number of times of retransmission.

For video/audio wireless transmission, the video/audio receiver 2 receives the coded video/audio data. The video/audio receiver 2 (i) judges, from the coded video/audio data, a level at which an error, an error rate, and electric field intensity influence the video/audio, and sends the judged result to the transmitter end; and (ii) decodes the received coded video/audio data and outputs the decoded data to the external monitor 4, for example.

Figure 2:
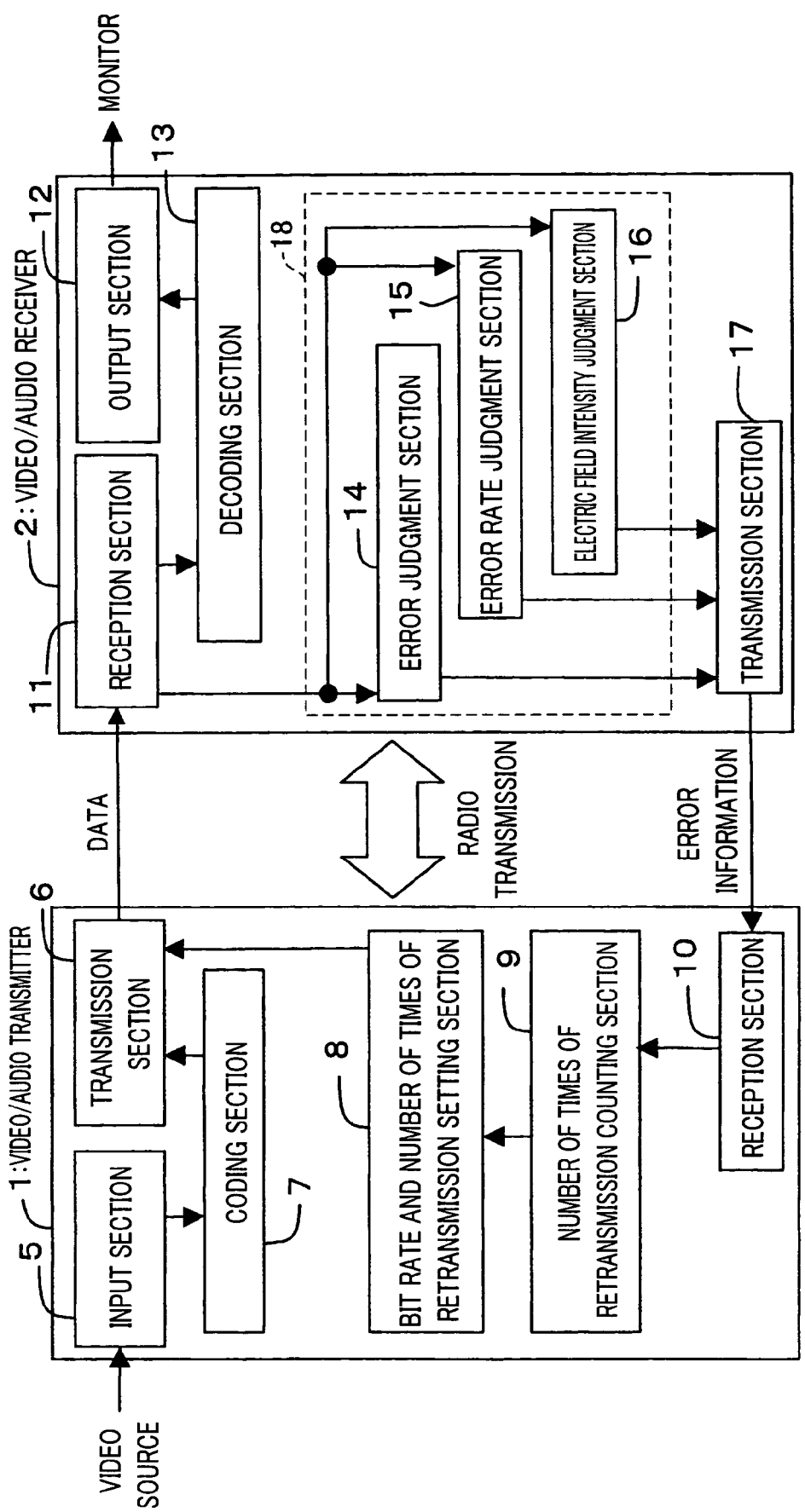
FIG. 2 is a block diagram illustrating an arrangement of the radio communication device according to the first embodiment.

FIG. 2 is a schematic block diagram illustrating an arrangement of the radio communication devices.

In FIG. 2, the video/audio transmitter 1 is arranged to comprise: an input section 5 for receiving video/audio inputted from the video source 3; a transmission section 6 (transmission means, second transmission means) for wirelessly transmitting the coded video/audio data to the receiver end; a coding section 7 for coding the signal inputted to the input section 5; a bit rate and number of times of retransmission setting section 8 (setting value storing means, transmission rate setting means) for setting a bit rate and a maximum number of times of retransmission according to the error information sent from the video/audio receiver 2 end; a number of times of retransmission counting section 9 for counting how many times the same data is retransmitted during data transmission, according to the error information sent from the video/audio receiver 2 end; and a reception section 10 (reception means, second reception means) for receiving the error information sent from the video/audio receiver 2.

In the bit rate and number of times of retransmission setting section 8, setting values which are respectively associated with transmission rates and numbers of times of retransmission are previously stored in a table format. The bit rate and number of times of retransmission setting section 8 chooses, according to the error information sent from the video/audio receiver 2, a stored setting value, and sets a transmission rate and a number of times of retransmission according to the chosen setting value.

The coding section 7, the bit rate and number of times of retransmission setting section 8, and the number of times of retransmission counting section 9 are constituted by, for example, a micro computer, and a data transmission function is realized by software. Moreover, the coding section 7 may be a separate electronic component such as a MPEG decoder.

The video/audio receiver 2 is arranged to comprise: a reception section 11 (reception means, first reception means) for receiving the coded video/audio data sent from the video/audio transmitter 1 end; an output section 12 for outputting the video/audio signal sent from the video/audio transmitter 1 end to outside the video/audio receiver 2; a decoding section 13 for decoding the coded video/audio signal sent from the video/audio transmitter 1 end; an error judgment section 14 (communication state detection means, error judgment means) for judging whether there is an error in the video/audio data sent from the video/audio transmitter 1 end or not; an error rate judgment section 15 (communication state detection means, error judgment means) for judging an error rate of the video/audio data sent from the video/audio transmitter 1 end; an electric field intensity judgment section 16 (communication state detection means, electric field intensity judgment means) for judging electric field intensity of the video/audio data sent from the video/audio transmitter 1 end; and a transmission section 17 (sending means, first sending means), wherein if the error judgment section 14, the error rate judgment section 15, or the electric field intensity judgment section 16 judges that the video/audio data sent from the video/audio transmitter 1 end has to be retransmitted and the maximum number of times of retransmission has to be set higher, the transmission section 17 sends the error information to the video/audio transmitter 1.

The decoding section 13, the error judgment section 14, the error rate judgment section 15, and the electric field intensity judgment section 16 are constituted by, for example, a micro computer, and a data transmission function is realized by software. Moreover, like the coding section 7 in the video/audio transmitter 1, the decoding section 13 may be a separate electronic component such as an MPEG encoder.

Operation of the radio communication device arranged as mentioned above will be explained below.

First, general operation of the radio communication device will be explained.

As illustrated in FIG. 1, the video/audio signal is inputted from the video source 3 to the video/audio transmitter 1, wirelessly transmitted to the video/audio receiver 2, and outputted to the monitor 4.

The video/audio receiver 2 judges that the reception electric field intensity is so low that the reception electric field intensity has an effect on the video/audio, and the error information is sent to the video/audio receiver 2, if, in transmission between the video/audio transmitter 1 and the video/audio receiver 2, the transmission is subject to interference by a surrounding frequency band and an error occurs in data, and/or if the error rate is so low that the video/audio are affected. The video/audio transmitter 1 receives the error information from the video/audio receiver 2, and lowers the bit rate and increases the number of times of retransmission in order to improve error tolerance.

Next, specific operation of the radio communication device will be explained.

As illustrated in FIG. 2, the video/audio signal inputted from the video source 3 to the video/audio transmitter 1 is inputted to the input section 5 of the video/audio transmitter 1, coded in the coding section 7 into a digital compressed signal which is suitable for wireless transmission, passed to the transmission section 6, and wirelessly transmitted to the video/audio receiver 2. The transmitted video/audio signal is received by the reception section 11 of the video/audio receiver 2, demodulated in the decoding section 13, and outputted from the output section 12 to the monitor 4. Here, the coded video/audio signal inputted to the reception section 11 at the receiver 2 end is passed to the error judgment section 14, to the error rate judgment section 15, and to the electric field intensity judgment section 16 via a path different from the path for the signal to be demodulated.

The error judgment section 14 judges whether there is an error in the received data or not. If the error judgment section 14 judges that there is an error in the received data, the data which was judged to contain an error should be retransmitted. Therefore, the transmission section 17 of the video/audio receiver 2 transmits a retransmission request to the video/audio transmitter 1 end. The number of times of retransmission counting section 9 of the video/audio transmitter 1 counts the number of times of retransmission, and the data which was judged to contain an error is retransmitted from the retransmission section 6 to the video/audio receiver 2 end. If an error occurs in the retransmission again, the procedure is repeated a predetermined number of times. The number of times of retransmission counting section 9 counts the number of times of retransmission. If the error is not corrected, after a set maximum number of times of retransmission, the bit rate and number of times of retransmission setting section 8 changes the bit rate, and sets the maximum number of times of retransmission higher, in order to avoid errors.

Moreover, if the error rate judgment section 15 judges that there is an error which deteriorates the video and audio quality to a level at which a large majority of users can not bear to watch the video or to listen to the audio, the judged information is transmitted from the transmission section 17 of the video/receiver 2 to the video/audio transmitter 1 end. The bit rate and number of times of retransmission setting section 8 of the video/audio transmitter 1 changes the bit rate, and sets the maximum number of times of retransmission higher, in order to increase error rate so as to avoid an error. Whether the error deteriorates the video and audio quality to a level at which a large majority of users can not bear to watch the video or to listen to the audio, is judged by comparison with an error rate level which is previously calculated, by experimentation, for example. Plural error rate levels may be provided. Moreover, it may be configured such that a user can chose the threshold value.

Moreover, if the electric field intensity judgment section 16 judges that the electric field intensity level is a level which causes errors that deteriorate the video and audio quality to a level at which a large majority of users can not bear to watch the video or to listen to the audio, the judged information is transmitted from the transmission section 17 of the video/audio receiver 2 to the video/audio transmitter 1 end. The bit rate and number of times of retransmission setting section 8 changes the bit rate, and increases the maximum number of times of retransmission, so as to avoid errors even when the electric field intensity is low. As in the case of the error rate, whether the reception signal has an electric field intensity at which a large majority of users can not bear to watch the video or to listen to the audio, is judged by comparison with a reception electric field intensity which is previously calculated, by experimentation, for example.

The error judgment section 14, the error rate judgment section 15, and the electric field intensity judgment section 16 constitute an error information generation section 18 for generating error information. Here, it is noted that at least one of these three sections suffice for generating error information. However, it is preferable to use information generated from two or all of three sections to generate more adequate error information.

Moreover, when errors are no longer found due to the lowered bit rate and the increased number of times of retransmission, in order to confirm if interference is still occurring or not, the bit rate is increased at regular time intervals, and the maximum number of times of retransmission is increased. Then, the following items are checked respectively: (i) at a newly set maximum number of times of retransmission, no error occurs again; (ii) the error rate is not low; or (iii) the electric field intensity is not low. If no problem is found, the bit rate and the maximum number of times of retransmission are set back to an original setting value.

Even when interference in the environment influences the radio communication devices, repetition of this operation gradually lowers bit rate and increases retransmission rate without deteriorating video/audio, so that it is possible to ensure transmission of image/audio with a quality such that a majority of users can bear to watch the image or listen to the audio.

That is, a characterizing part of the invention in the present application is a process in which a bit rate is temporarily lowered when interference occurs, and the bit rate is increased again when the interference is no longer detected. The process can minimize image deterioration. As a result, it is possible to receive high quality video and audio data.

Figure 3:
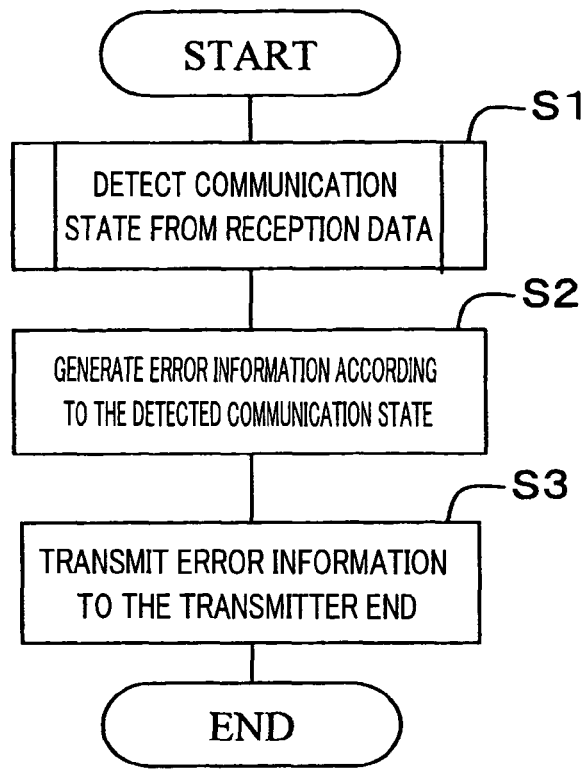
FIG. 3 is a flow chart illustrating a radio transmission rate changing operation at a video/audio receiver end in the radio communication device according to the first embodiment.
Figure 4:
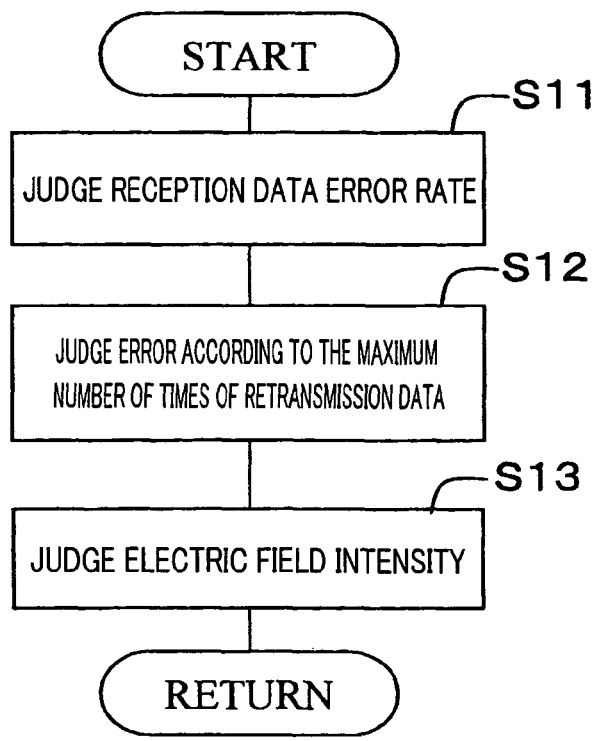
FIG. 4 is a flow chart illustrating a radio transmission rate changing operation at a video/audio receiver end in the radio communication device according to the first embodiment.
Figure 5:
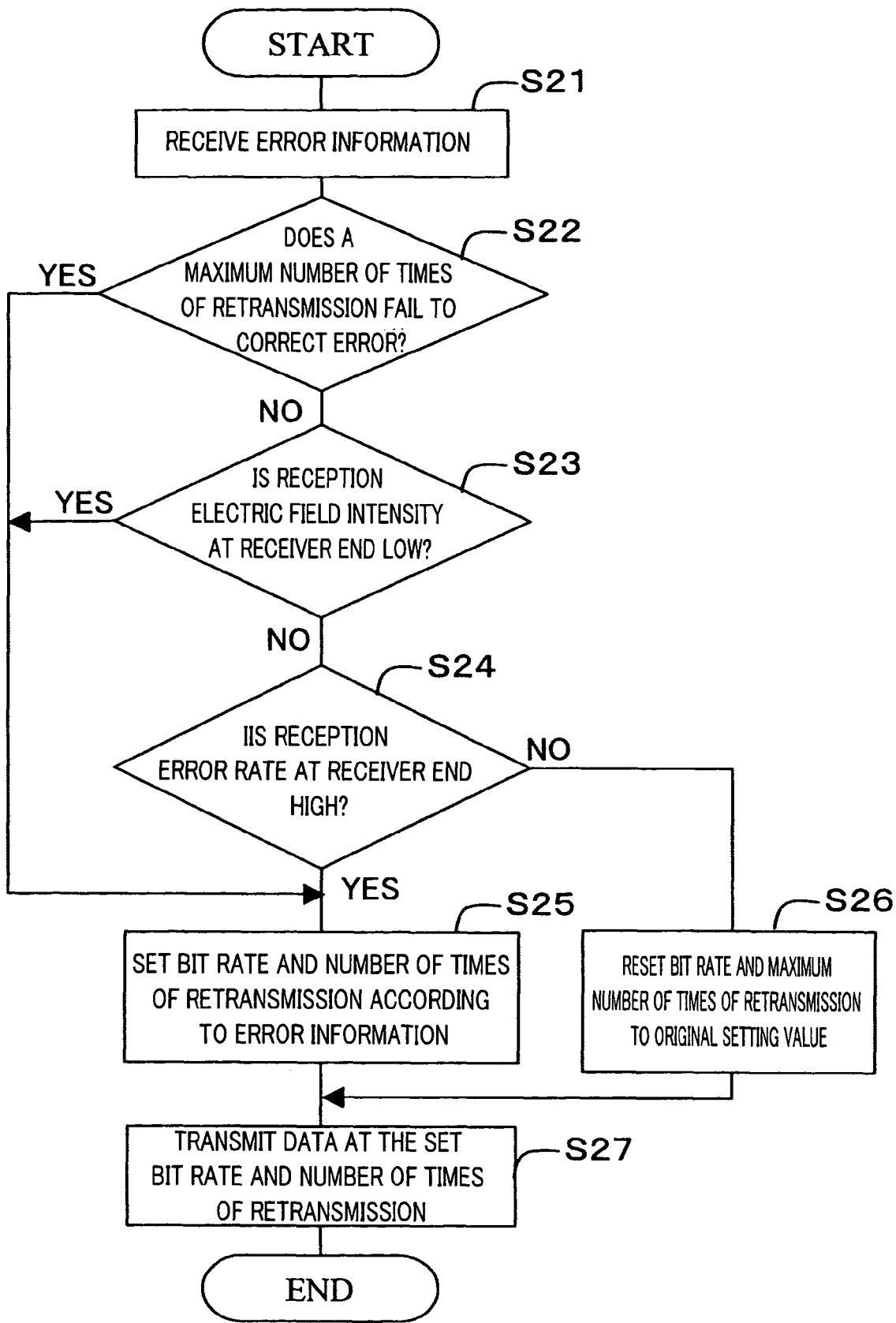
FIG. 5 is a flow chart illustrating a radio transmission rate changing operation at a video/audio transmitter end in the radio communication device according to the first embodiment.

FIGS. 3-5 illustrate flow charts illustrating the above mentioned operation of the radio communication devices. FIG. 3 and FIG. 4 illustrate radio transmission rate changing operation of the video/audio receiver 2 end. FIG. 5 illustrates radio transmission rate changing operation of the video/audio transmitter 1 end. In these figures, S refers to each step in the procedure.

According to the procedure at the video/audio receiver 2 end in FIG. 3, first, from the reception data, a communication state between the video/audio transmitter 1 and the video/audio receiver 2 is detected (step S1).

Then, based on the detected communication state, error information is generated (step S2).

Afterward, the generated error information is transmitted from the transmission section 17 to the video/audio transmitter 1 and the procedure is terminated (step S3).

FIG. 4 illustrates a subroutine for detecting the communication state. The subroutine corresponds to the process in step S1 in FIG. 3.

First, the error rate judgment section 15 judges an error rate of the reception data (step S11).

Then the error judgment section 14 judges, according to the number of times of retransmission data, an error of the received data (step S12).

Afterward, the electric field intensity judgment section 16 judges the electric field intensity of the reception signal (step S13), and the sequence goes back to step S1 in FIG. 3.

If at least one of the three steps S11-S13 are performed, it is possible to generate error information using the error information generation section (error information generation means) 18 in step S2 illustrated in FIG. 3.

For example, it is possible to generate error information only with the judged error rate, to generate error information only with the judged error, or to generate error information only with the judged electric field intensity of the reception signal. Moreover, it is possible to generate error information from a combination of error rate and error, a combination of error rate and electric field intensity of the reception signal, a combination of error and electric field intensity of the reception signal, or a combination of error rate, error and electric field intensity of the reception signal.

Moreover, when video and audio data is played at the receiver 2 end, in steps S11-S13, it is judged whether an error deteriorates the video and audio quality to a level at which a large majority of users can not bear to watch the video or to listen to the audio. This judgment may include plural judgment levels (for example, first judgment level, second judgment level) according to error levels. Moreover, different judgment standards may be provided for each error, or priority may be set for judgments. In this case, it is preferable to generate error information according to the judgment level, and transmit the error information to the video/audio transmitter 1 end.

FIG. 5 illustrates a flow chart illustrating a procedure at the video/audio transmitter 1 end.

First, error information transmitted from the video/audio receiver 2 end is received (step S21).

Afterward, according to the received error information, it is judged whether the maximum number of times of retransmission can correct an error or not (step S22). If it is judged that the error can be corrected, in step 23, it is judged whether the video/audio receiver 2 end reception electric field intensity is at a low level or not.

If it is judged in step S23 that the electric field intensity is not at a low level, in step S24, it is judged whether the receiver 2 end reception error rate is at a high level or not.

On the other hand, if it is judged in step S22 that the maximum number of times of retransmission can not correct the error, if it is judged in step S23 that the reception electric field intensity is at the low level, or if it is judged in step S24 that the reception error rate is at the high level, then in step 25 the bit rate and the number of times of retransmission is set according to the received error information.

Here, if errors occur during wireless transmission of the image and audio in an environment with much interference, and after the set maximum number of times of data retransmission, no correct data can be transmitted, the bit rate and number of times of retransmission setting section 8 lowers the bit rate (transmission rate) and increases the number of times of retransmission, in order to improve error tolerance.

Therefore, in step S25, the bit rate and the number of times of retransmission is set such that the bit rate is lowered, and the number of times of retransmission is increased. Specific examples of the setting of the bit rate and the number of times of retransmission according to the error information will be explained later with reference to the second and third embodiments.

If it is judged in step S24 that the reception error rate is not at a high level, in step S26, the bit rate and the maximum number of times of retransmission is set back to the original setting value, and the sequence goes to step S27.

In step S27, data is transmitted according to the set bit rate and the set number of times of retransmission to the video/audio receiver 2 and the procedure is terminated.

As mentioned above, for the real time transmission of moving image/audio, a plurality of association patterns between bit rates and a number of times of retransmission are initially provided. In one example of an association pattern of a bit rate and a number of times of retransmission, it is possible to clearly demodulate video and audio when there is no interference, and in another example of an association pattern of a bit rate and a number of times of retransmission, the bit rate is low, but the video and audio quality is at a level at which a majority of users can bear to watch the video or listen to the audio. In a normal communication state, fixed bit rate transmission is performed with a maximum bit rate, and only when interference occurs, is it controlled such that the bit rate is temporarily lowered, and the number of times of retransmission is increased.

As explained so far, in the radio communication device in accordance with the present embodiment, the video/audio receiver 2 is arranged to comprise the reception section 11 for receiving the video/audio data; the error judgment section 14 for judging errors in the video/audio data; the error rate judgment section 15 for judging an error rate in the video/audio data; the electric field intensity judgment section 16 for judging an electric field intensity of the video/audio data; and the transmission section 17 for transmitting error information. The video/audio transmitter 1 is arranged to comprise the transmission section 6 for transmitting the video/audio data; the bit rate and number of times of retransmission setting section 8 for setting, according to the error information, the bit rate and the maximum number of times of retransmission; the number of times of retransmission counting section 9 for counting how many times the same data is retransmitted; and the reception section 10 for receiving the error information. In this arrangement, when the transmission is affected by interference in the surrounding environment. In this arrangement, the bit rate is lowered and the number of times of retransmission is increased automatically according to several predetermined types of setting values which are respectively associated with bit rates and numbers of times of retransmission, so that it is possible to realize an automatic bit rate and number of times of retransmission changing function with higher interference tolerance.

That is, for transmission of video/audio and the like, in an environment in which there is much interference in the frequency band used, there arises such a problem that reception of the video and audio is stopped by the interference. Patent Document 1 discloses a device with which it is possible to reduce the reception data loss rate due to data errors, even when noise in the reception environment increases.

However, the device disclosed in Patent Document 1 requires changing a compression rate and number of times of retransmission according to an error rate in every data packet transmission, or increasing compression rate and number of times of retransmission as an error rate of the received data increases. Such a device reduces errors, but video and; the like can be deteriorated to a level at which a majority of users can not bear to watch the video and the like. On the contrary, in the present embodiment, a fixed bit rate transmission which always ensures that a bit rate required for video and audio transmission is realized, while an error caused by the interference is judged only in cases when interference occurs, and before the error visibly deteriorates the video and audio, the bit rate is temporarily lowered, and the number of times of retransmission is increased. In such an embodiment, it is possible on one hand to always reproduce clear video/audio when no interference occurs. On the other hand, when interference occurs, it is possible to minimize pronounced interference with slight deterioration of image quality/audio quality.

Embodiment 2

Another embodiment of the present invention will be explained in the following. Here, referring to the present embodiment, method of changing a bit rate and number of times of retransmission in the radio communication device will be explained. Since the arrangement of hardware is the same as in FIG. 1 and FIG. 2, explained in Embodiment 1, the detailed descriptions thereof will be omitted.

Figure 6:
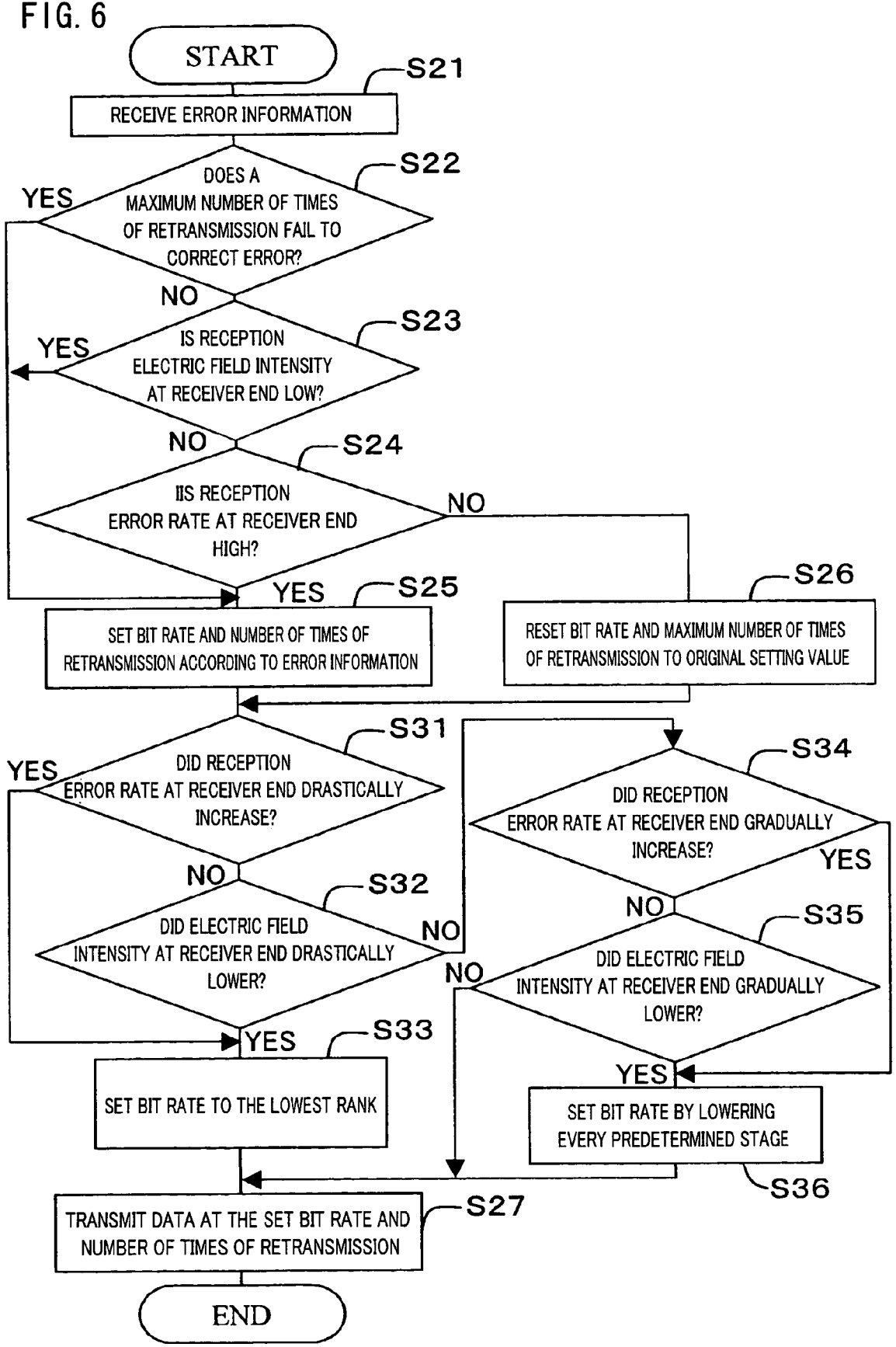
FIG. 6 is a flow chart illustrating a radio transmission rate changing operation at a video/audio transmitter end in a radio communication device according to a second embodiment of the present invention.

FIG. 6 illustrates a flow chart illustrating a radio transmission rate changing operation at the video/audio transmitter 1 end of the radio communication device according to the embodiment. The radio transmission rate changing operation is performed by, for example, a micro computer, which constitutes the bit rate and number of times of retransmission setting section 8 and the number of times of retransmission counting section 9 in FIG. 2. Steps for performing the same processes as the processes in FIG. 5 are given the same step number, and descriptions thereof are omitted.

FIG. 7 illustrates an example of associations of a bit rate and a maximum number of times of retransmission which is referenced in video/audio data transmission, where the example is for MPEG rate to transmit an MPEG stream.

In FIG. 7, the MPEG rate has both MPEG rates (Mbps), and maximum number of times of retransmission which are respectively associated with setting values. Every setting value has a maximum and minimum transfer rate and an MPEG rate (Mbps). The maximum number of times of retransmission refers to a number of retransmissions performed by the video/audio transmitter 1 when the communication state deteriorates.

For example, as a in FIG. 7 indicates, in case of the best communication state, a setting value "0x21" is used, where an MPEG rate is 7.86 (Mbps) and a maximum number of times of retransmission is "1". However, in case of a deteriorated communication state, according to a degree of deterioration, a setting value "0x16" is used, for example, as indicated by b. in FIG. 7, where an MPEG rate is 7.18 (Mbps), and a maximum number of times of retransmission is "2". Moreover, for example, the setting value "0x0C" may be used, as indicated by c. in FIG. 7, where an MPEG rate is 5.85 (Mbps) and a maximum number of times of retransmission is "4". The above mentioned setting values and MPEG rates are given by means of example but the present invention is not limited to these examples. As explained above, in the present invention, a bit rate can be changed according to the communication state.

Referring to the flow chart illustrated in FIG. 6, a procedure at the transmitter end of the radio communication device according to the embodiment will be explained.

First, in step S25, the bit rate and the number of times of retransmission is set according to the received error information, or in step S26, the bit rate and the maximum number of times of retransmission is set back to the original setting value. Then, in step S31, it is judged whether the video/audio receiver 2 end reception error rate drastically increases or not.

Here, it is judged that the error rate drastically increases when an absolute value of difference between a detected value and a previous value (a value in an immediately preceding, definite time period) exceeds a predetermined range. This judgment method is an example. According to an error rate level, a threshold value may be changed. Appropriate value(s) are previously determined by performing, for example, a simulation.

If it is judged in step S31 that the error rate did not drastically increase, in step S32, it is judged whether the video/audio reception 2 end electric field intensity drastically lowered, or not. Whether the electric field intensity drastically lowered or not can be judged according to a similar judgment method to that of step S31.

If it is judged in step S31 that the reception error rate drastically increased, or if it is judged in step S32 that the video/audio receiver 2 end electric field intensity drastically lowered, it is judged that the communication state has drastically deteriorated for some reason, and in step S33, the bit rate is lowered to the lowest rank, and then the sequence goes to step S27.

For example, when the bit rate is set to the MPEG rate 7.18 (Mbps) of the setting value "0x16", as indicated by b. in FIG. 7, if the reception error rate or the electric field intensity drastically lowers, the bit rate is lowered directly to the lowest rank as indicated by d. in FIG. 7, rather than gradually lowered on a step-by-step basis. In this manner, when the communication state drastically deteriorates, such as when communication is subject to interference, before the interference becomes apparently visible on video and audio, the bit rate is lowered directly and the number of times of retransmission is increased. This makes it possible to ensure communication.

The flow chart illustrated in FIG. 6 is referred to again. If it is judged in step S32 that the video/audio receiver 2 end electric field intensity did not drastically lower, in step S34, it is judged whether the video/audio receiver 2 end reception error rate gradually increased or not.

Here, whether the error rate gradually increased or not can be judged by making a comparison of difference between a detected value and a previous value (a value in an immediately preceding, definite time period). If it is judged that the error rate did not gradually increase, whether the video/audio receiver 2 end electric field intensity gradually lowered or not is judged in step S36. Whether the electric field intensity gradually lowered or not can be judged by a similar method to the judgment process in step S34.

If it is judged in step S34 that the reception error rate gradually increased, or if it is judged in step S35 that the video/audio receiver 2 end electric field intensity gradually lowered, in step S36, the bit rate is gradually lowered on a predetermined step-by-step basis (for examples one rank at a time) and then the sequence goes to step S27.

For example, the MPEG rate 7.86 (Mbps) of the setting value indicated by a. in FIG. 7 is lowered by one rank to be set to an MPEG rate 7.81 (Mbps) of a setting value indicated by e. in FIG. 7. The above mentioned setting values and MPEG rates are given by means of example but are not limited to these examples. For example, in the above case, it is possible that the MPEG rate 7.68 (Mbps) of the setting value indicated by a. in FIG. 7 is lowered to be set to the MPEG rate 7.18 (Mbps) of the setting value indicated by b. in FIG. 7.

If it is judged in step S35 that the video/audio receiver 2 end electric field intensity did not gradually lower, then the sequence goes directly to step S27. With this, when the communication state gradually deteriorates, the bit rate is gradually lowered on a step-by-step basis. This makes it possible to ensure communication while maintaining as much image quality/audio quality as possible.

Embodiment 3

Still another embodiment of the present invention will be explained in the following. With reference to the present embodiment, a method of changing a bit rate and number of times of retransmission in the radio communication device will be explained. Since the arrangement of hardware is the same as in FIG. 1 and FIG. 2, explained in the Embodiment 1, the descriptions thereof will be omitted.

Figure 8:
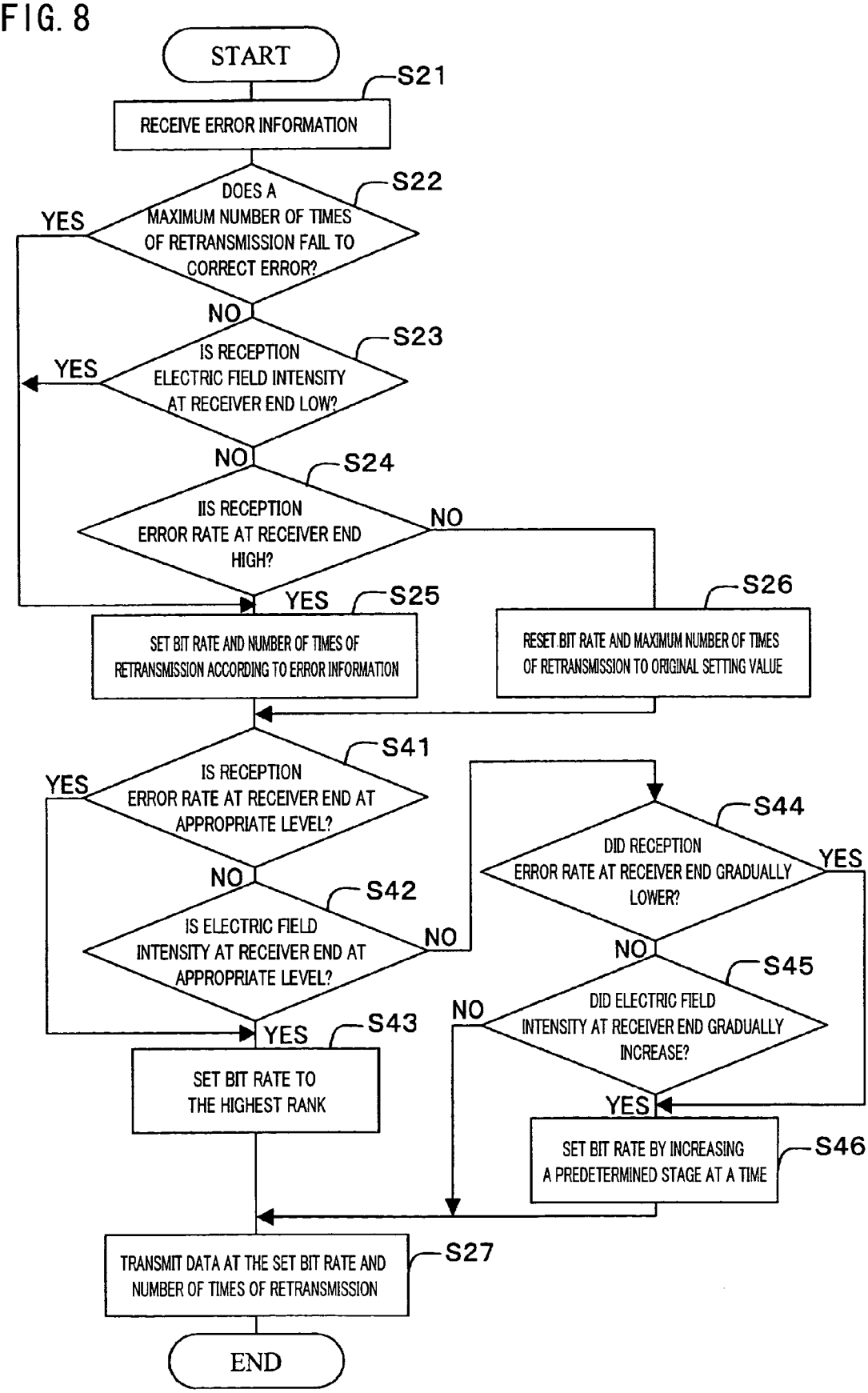
FIG. 8 is a flow chart illustrating a radio transmission rate changing operation at a video/audio transmitter end in a radio communication device according to a third embodiment of the present invention.

FIG. 8 illustrates a flow chart illustrating a radio transmission rate changing operation at a video/audio transmitter 1 end of the radio communication device. Steps for performing the same processes as the processes in FIG. 5 are given the same step numbers, and descriptions thereof are omitted.

In the flow chart illustrated in FIG. 8, if in step S25, the bit rate and the number of times of retransmission is set according to the received error information, or if in step S26, the bit rate and the maximum number of times of retransmission is set back to the original setting value, it is judged in step S41 whether the video/audio receiver 2 end reception error rate is at an appropriate level or not.

Here, when the detected value is within a range of levels in which no interference is found, it is judged that the error rate is at an appropriate level. This judgment method is an example, but it is possible to change a threshold value according to an error rate level. An appropriate value is previously determined by performing, for example, a simulation.

If it is judged in step S41 that the error rate is not at an appropriate level, in step S42, it is judged whether the video/audio receiver 2 end electric field intensity is at an appropriate level or not. For a threshold value indicating that the error rate or the electric field intensity is at an appropriate level, an appropriate value is set by previously performing, for example, a simulation.

If it is judged in step S41 that the error rate is at an appropriate level, or if it is judged in step S42 that the video/audio receiver 2 end electric field intensity is at an appropriate level, it is judged that the error rate and/or the electric field intensity has recovered to a level at which no interference is found, and in step S43, the bit rate is set to the highest rank, and then the sequence goes to step S27.

For example, when the bit rate is set to the MPEG rate 7.18 (Mbps) of the setting value "0x16", as indicated by b. in FIG. 7, the bit rate is increased directly to the highest rank as indicated by a. in FIG. 7, rather than gradually increased on a step-by-step basis. In this manner, when the communication state recovers, it is possible to rapidly increase image quality/audio quality. It is noted that in step S41 and in step S42, whether the error rate or the electric field intensity is at an appropriate level may be judged on the basis of two or more levels. For example, two levels, i.e. a first appropriate level and a second appropriate level which is lower than the first appropriate level, are provided. With this, it is possible to control the bit rate such that when the error rate or the electric field intensity achieves the first appropriate level, the bit rate is increased to the highest rank, and when the error rate or the electric field intensity achieves the second appropriate level, the bit rate is increased to a level between the lowest rank and the highest rank.

The flow chart illustrated in FIG. 8 is referred to again. If it is judged in step S42 that the video/audio receiver 2 side electric field intensity is not at an appropriate level, in step S44, it is judged whether the video/audio receiver 2 end reception error rate is gradually lowered or not. Whether the error rate is gradually lowered or not can be judged by making a comparison of difference between a detected value and a previous value (a value in an immediately preceding, definite time period). If it is judged that the error rate did not gradually lower, whether the video/audio receiver 2 end electric field intensity is gradually increased or not is judged in step S45. Whether the electric field intensity gradually lowered or not can be judged by the same method as in the judgment process in step S44.

If it is judged in step S44 that the reception error rate gradually lowered, or if it is judged in step S45 that the video/audio receiver 2 end electric field intensity gradually increased, in Step S46, the bit rate is gradually lowered on a predetermined step-by-step basis (for example, one rank at a time) and then the sequence goes to step S27.

For example, the MPEG rate 7.18 (Mbps) of the setting value indicated by b. in FIG. 7 is increased by one rank to be set to an MPEG rate 7.26 (Mbps) of a setting value indicated by f. in FIG. 7. The above mentioned setting values and MPEG rates are given by means of example but are not limited to these examples. If it is judged in step S45 that the video/audio receiver 2 end electric field intensity did not gradually lower, then the sequence goes directly to step S27.

In this way, when the communication state is back at the level where no interference is found, the bit rate is directly increased to the highest rank, so that it is possible to reproduce image and audio in high quality, and when the communication state is gradually recovered, the bit rate is gradually increased on a step-by-step basis, so that it is possible to gradually increase the image and audio quality while ensuring communication.

Here, once interference occurred, the communication state is rarely recovered immediately after the interference. Therefore, it may be arranged such that the error rate and the electric field intensity are checked at some intervals, rather than checked constantly. In this case, steps S41-S46 are performed at some intervals.

Embodiment 4

Yet another embodiment of the present invention will be explained in the following.

Figure 9:
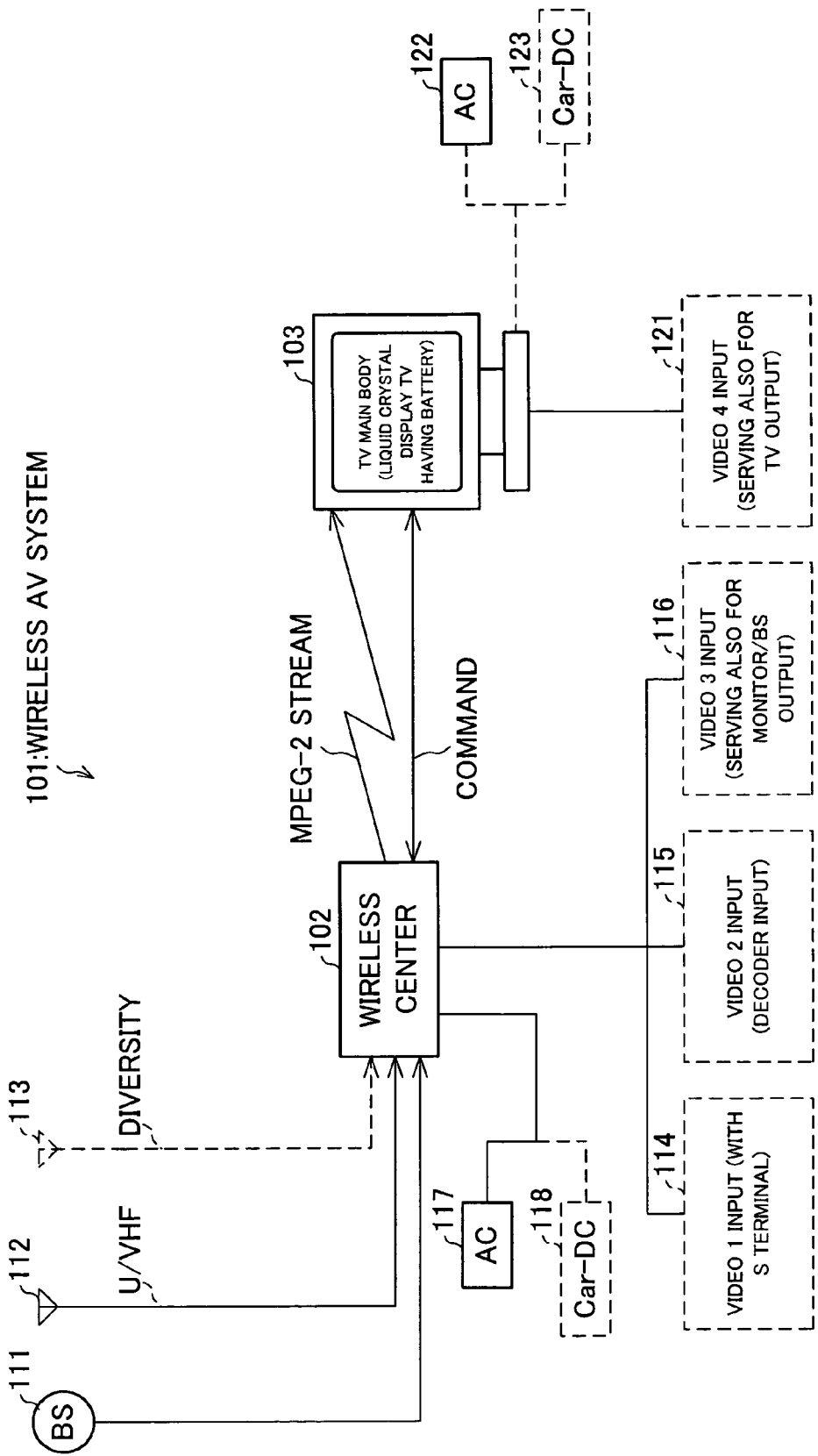
FIG. 9 is a block diagram illustrating an arrangement of a radio communication device, a transmitter, a receiver, and a wireless AV system according to a fourth embodiment of the present invention.

FIG. 9 illustrates a block diagram illustrating an arrangement of a radio communication device according to the present embodiment. The block diagram shows an example in which the radio communication device according to the present embodiment is applied to a display separation type wireless TV receiver, as illustrated in FIG. 13.

Figure 13:
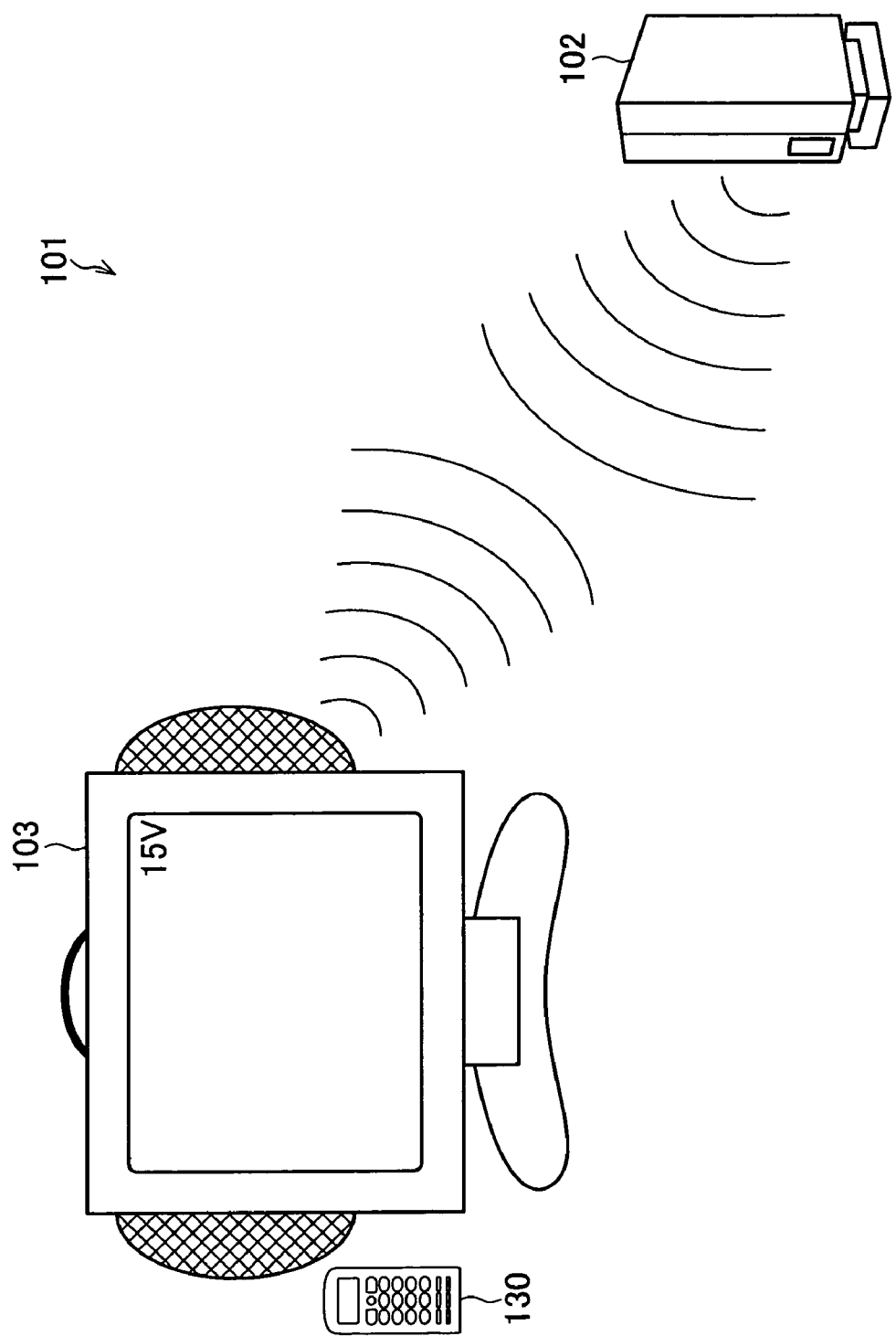
FIG. 13 is a diagram illustrating a substantial arrangement of a specific example of a wireless AV system using a radio communication device according to the present invention.

That is, as illustrated in FIG. 13, the wireless AV system 101 includes a TV main body unit 103 and a wireless center unit 102.

The TV main body unit 103 has a battery built-in, and includes a wireless TV set, and a remote controller 130, which enables remote operation of a video player and the like via the TV main body unit 103, the video player and the like being connected to the wireless center unit 102.

In FIG. 9, the wireless AV system 101 includes a wireless center unit (hereinafter referred to as wireless center) 102 which is a base apparatus, and a television (TV) main body unit (hereinafter referred to as TV main body) 103 which is a portable terminal. The wireless center 102 (radio communication device, transmitter, center device) and the TV main body 103 (radio communication device, receiver, display device) establish in pairs a radio transmission network.

The wireless center 102 has antennae terminals, namely a BS terminal 111, a U/VHF antennae terminal 112, and a diversity terminal 113. The wireless center 102 includes: a video 1 input terminal 114 which has an S terminal for connecting an apparatus such as a digital VTR or a DVD player; a decoder input/video 2 input terminal 115; a monitor/BS output/video 3 input terminal 116; an AC power source section 117; and a car-DC power source section 118.

The TV main body 103 includes: a TV output/video 4 input terminal 121 for connecting an apparatus such as a digital VTR or a DVD (Digital Versatile Disc) player; an AC power source section 122; and a Car-DC power source section 123.

Moreover, the TV main body 103 is a flat panel display device which can be separated from the wireless center 102, and has the battery built-in. Thus, the TV main body 103 is portable or movable. The TV main body 103 represents a wide concept including various kinds of display devices such as a liquid crystal display television (hereinafter referred to as liquid crystal display TV), an inorganic EL/organic EL display, and a plasma display, but is not limited by display mechanism. Moreover in this specification, the TV main body 103 generally has a display function and an acoustic function, while the wireless center 102 generally has a tuner section, and a control function for controlling the TV main body 103. The TV main body 103 according to the present embodiment will be explained with reference to a flat panel display device in a liquid crystal display TV.

Between the wireless center 102 and the TV main body 103, data is transmitted according to an SS (Spread Spectrum) radio system based on IEEE 802.11b standard. In recent years, a 5 GHz band has become publicly available as a frequency band. Therefore, instead of a 2.4 GHz band, the 5 GHz band may be used. For data transmission from the wireless center 102 to the TV main body 103, an MPEG (Moving Picture Expert Group) 2 video compression format is used to transmit moving images, DVD-Video, and digital broadcasting over a more than 10 Mbps communication line. Moreover, command transmission between the wireless center 102 and the TV main body 103 is performed according to the SS radio system.

For practical application, it is necessary for MPEG video and MPEG audio coded streams (bit strings) and other coded streams to be synchronized and multiplexed into a single stream, and to be converted into a data format which is suitable for a physical format and protocol dedicated to storage media and networks.

In an MPEG-2 System, two streams are used. The two streams are classified into a program stream (MPEG-2-PS, PS: Program Stream) in which one program is organized in the same manner as in MPEG-1, and a transport stream (MPEG-2-TS, TS: Transport Stream) in which plural programs can be organized.

An MPEG stream is a byte stream which is byte-aligned according to each unit such as header, although there are a number of one-bit flags. A common organization for all MPEG systems is that length information precedes a variable length data portion. Therefore, if the variable length data portion is not necessary, the portion is skipped, and a header of a next data group is checked. With this, a separation process can be performed with high reliability.

A device, which is based on an MPEG-2 coding system and receives a compressed image and audio signal, requires synchronization of (i) a video and audio sampling frequency at a coding end, and (ii) a video and audio sampling frequency or STC (System Time Clock) at a decoding end, in order to prevent overflow and underflow of the video and audio data at the decoding end.

For this purpose, at the decoding device, a PCR (Program Clock Reference) specified in the MPEG-2 system standard (ISO/IEC Standard 13818-1), or an SCR (System Clock Reference) is used in order to synchronize (i) the video and audio sampling frequency at the coding end, and (ii) the video and audio sampling frequency at the decoding end.

Figure 10:
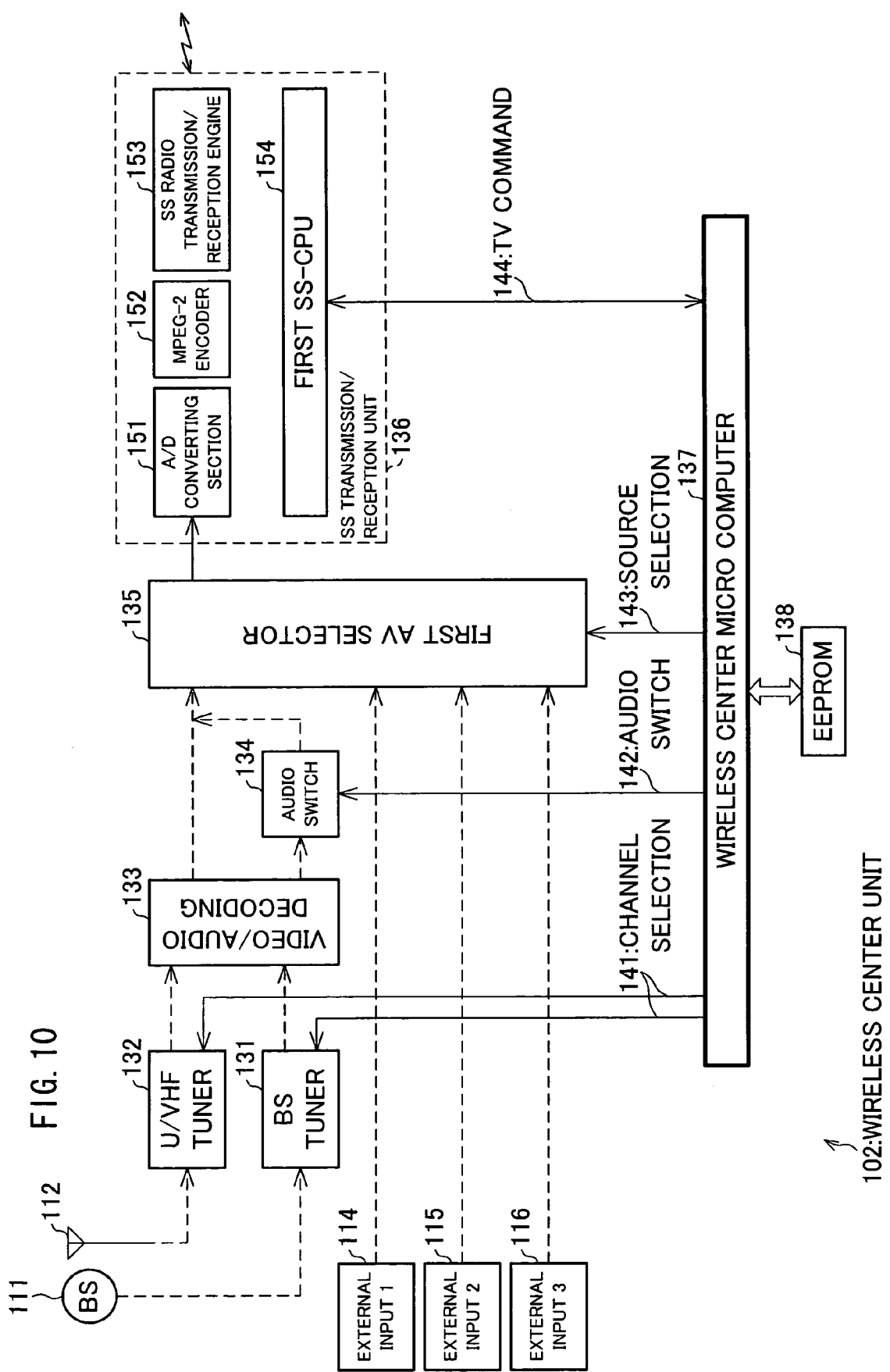
FIG. 10 is a block diagram illustrating an arrangement of a wireless center which corresponds to the radio communication device, the transmitter, the receiver, and the wireless AV system according to the fourth embodiment.

FIG. 10 is a block diagram illustrating an arrangement of the wireless center 102 of the wireless AV system.

In FIG. 10, the wireless center 102 is arranged to include: a BS tuner 131 which is connected to the BS terminal 111 and receives and selects BS broadcasting, according to a channel selection signal; a U/VHF tuner 132 which is connected to the U/VHF antenna terminal 112 and receives and selects U/VHF broadcasting, according to a channel selection signal; a video/audio decoding section 133 for decoding a video/audio (AV) signal received and selected at the BS tuner 131 or at the U/VHF: tuner 132; an audio switch section 134 for switching between received audio and information relating to a program such as an EPG(Electric Program Guide), according to an audio switch signal; a first selector 135 for selecting (i) the received video/audio information or the information relating to the program, (ii) information externally inputted into the video 1 input terminal 114, (iii) information externally inputted into the decoder input/video 2 input terminal 115, or (iv) information externally inputted into the monitor/BS output/video 3 input terminal 116, according to a source selection signal; an SS transmission unit 136 (transmission means, reception means, second transmission means, second reception means) for transmitting/receiving a TV command so as to convert the data selected by the first selector 135 into an MPEG-2 video compression format, and for transmitting the data in the SS radio system to the TV main body 103; a wireless center micro computer 137 (transmission rate setting means) for transmitting the channel selection signal 141, the audio switch signal 142, the source selection signal 143 and the like, and for transmitting/receiving the TV command 144 so as to control the whole device; and an electrically erasable nonvolatile memory, EEPROM (electrically erasable programmable ROM) 138 (setting value storing means) for storing a control program for the wireless center microcomputer 137, communication control data, and various data on MPEG rates set for various contents.

The wireless center 102 includes plural (two) tuners for receiving broadcasting. At least one of these plural tuners, i.e. the BS tuner 131 or the U/VHF tuner 132 may be a tuner which can receive terrestrial digital broadcasting.

The SS transmission unit 136 is arranged to include: an A/D converting section 151 for converting the data selected by the first selector 135 into a digital signal; an MPEG-2 encoder 152 for converting the data into the MPEG-2 video compression format; an SS radio transmission engine 153 constituted by an SS radio apparatus for transmitting transmission data in the SS radio system, and a radio control section; and a first SS-CPU 154 (communication state detection means) for controlling the SS radio and the radio control section of the SS transmission unit, and for detecting a radio wave state.

In the EEPROM 138, the MPEG rate set for each content as shown in FIG. 7 is stored in a table. Changes in program to be written into the EEPROM 138 allow the wireless center 102 and the TV main body 103 to be changed in their specification variously. That is, in recent years, in order to avoid time loss for changing a mask ROM for every debug in system development, a nonvolatile memory, such as an EPROM and an EEPROM, is used as a program ROM to shorten the amount of time for program development and correction. Moreover, it is possible to easily upgrade and change functions by downloading a program in order to rewrite program contents in the EEPROM.

The SS radio transmission engine 153 has a transmission function for transmitting an MPEG-2 stream, a command and the like to an SS reception unit 161 (which will be explained later with reference to FIG. 11) in the TV main body 103, and a reception function for receiving a command and the like from the SS reception unit 161.

Especially, the first SS-CPU 154 has a function as radio wave state detection means. According to a retransmission request based on electric field intensity and an error rate of the received radio wave, the radio wave state detection means detects a communication state (strength of a radio wave, interference in a communication path) between the wireless center 102 and the TV main body 103. Information showing the detected radio wave state is, as the TV command 144, transmitted to the wireless center microcomputer 137. In the present embodiment, descriptions are given as to the case where the first SS-CPU 154 for the wireless center microcomputer 137 has the radio wave state detection function. However, a second SS-CPU 184 in the TV main body 103 may have the radio wave state detection function, and perform command transmission in which information showing the detected radio wave state is transmitted from the TV main body 103 to the wireless center 102. Alternatively, both the first SS-CPU 154 and the second SS-CPU 184 may be arranged to have the radio wave state detection function. Moreover, the radio wave state detection function can be performed by a TV microcomputer 164 or the wireless center microcomputer 137.

The wireless center microcomputer 137 controls the whole device. Moreover, in the wireless center microcomputer 137, setting values which are respectively associated with transmission rates and numbers of times of retransmission are previously stored in a table format as shown in FIG. 7. According to error information sent from the TV main body 103, the wireless center microcomputer 137 selects a stored setting value. Then, according to the selected setting value, the wireless center microcomputer 137 sets the transmission rate and number of times of retransmission.

Here, an example of technology for realizing a wireless AV system includes a standard specification called HAVi (Home Audio/Video Interoperability) Architecture which was standardized in January 2000. The specification, as disclosed in the summary (1.1 Scope, in 1 General) in the HAVi V 1.0 Specification edition, realizes provision of an interface, wherein the interface, to which consumer electronics, a computer or the like is connected, allows a user to use an apparatus to operate another apparatus. In the HAVi specification, descriptions are given of an example in which a network is established between consumer electronics based on IEEE 1394 and consumer electronics based on IEC (International Electrotechnical Commission) 61883. Moreover, as described in the summary of the specification, all users can arbitrarily use an apparatus connected to the network realized by HAVi. In this way, connection of an AV apparatus for domestic use establishes an AV network, so that a user can use apparatuses in remote rooms in any combination.

Moreover, in addition to the use of the wireless center 102 which is a transmitter, and the TV main body 103 which is a receiver for such a domestic AV network, the wireless center 102 and the TV main body 103 may be used as a radio communication terminal such as mobile telephone/PHS (Personal Handy-Phone System) (Registered trademark) and Personal Digital Assistants (hereinafter, referred to as PDA) for performing radio transmission.

Figure 11:
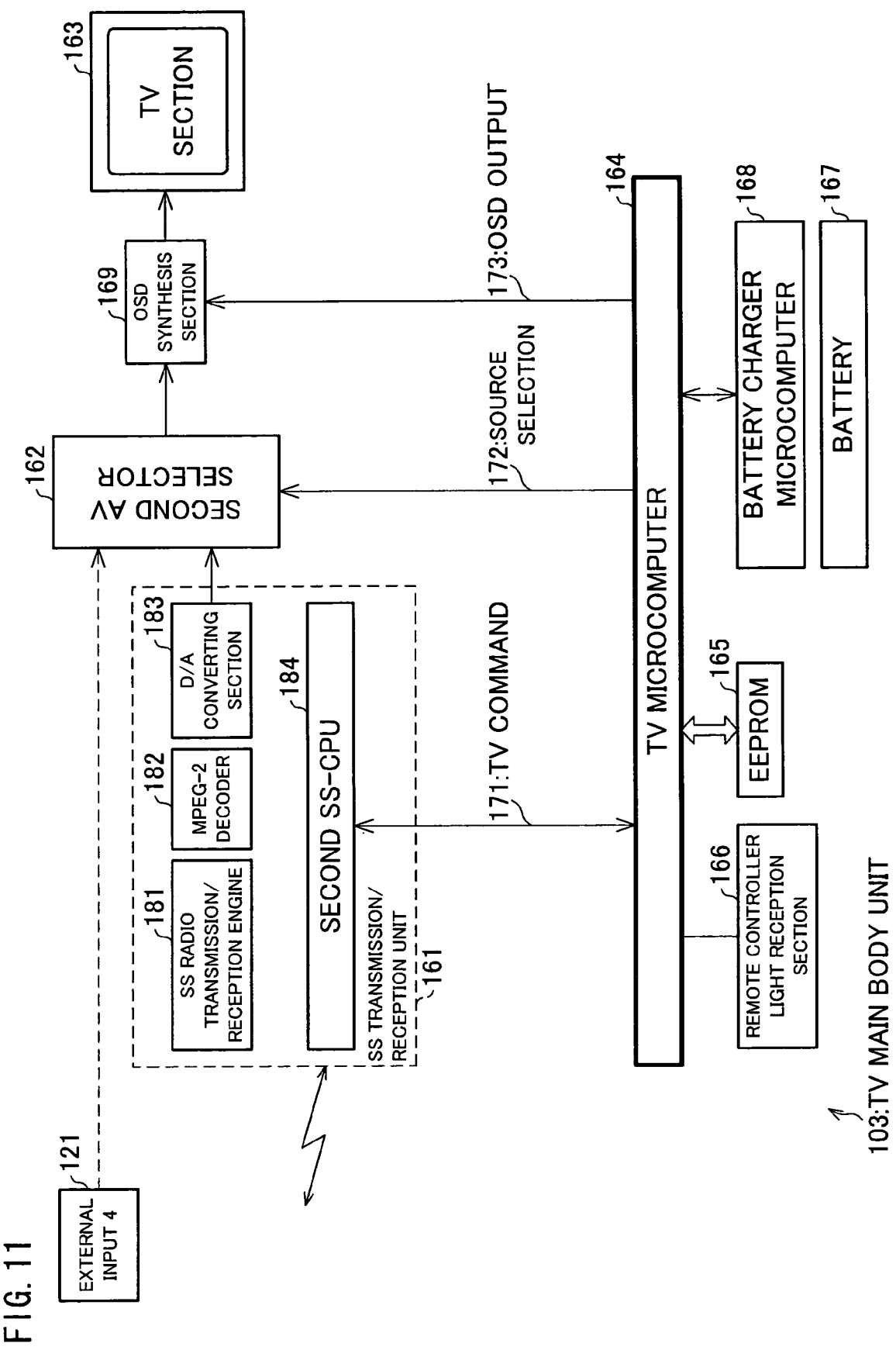
FIG. 11 is a block diagram illustrating an arrangement of a TV main body which corresponds to the radio communication device, the transmitter, the receiver, and the wireless AV system according to the fourth embodiment.
Figure 12:
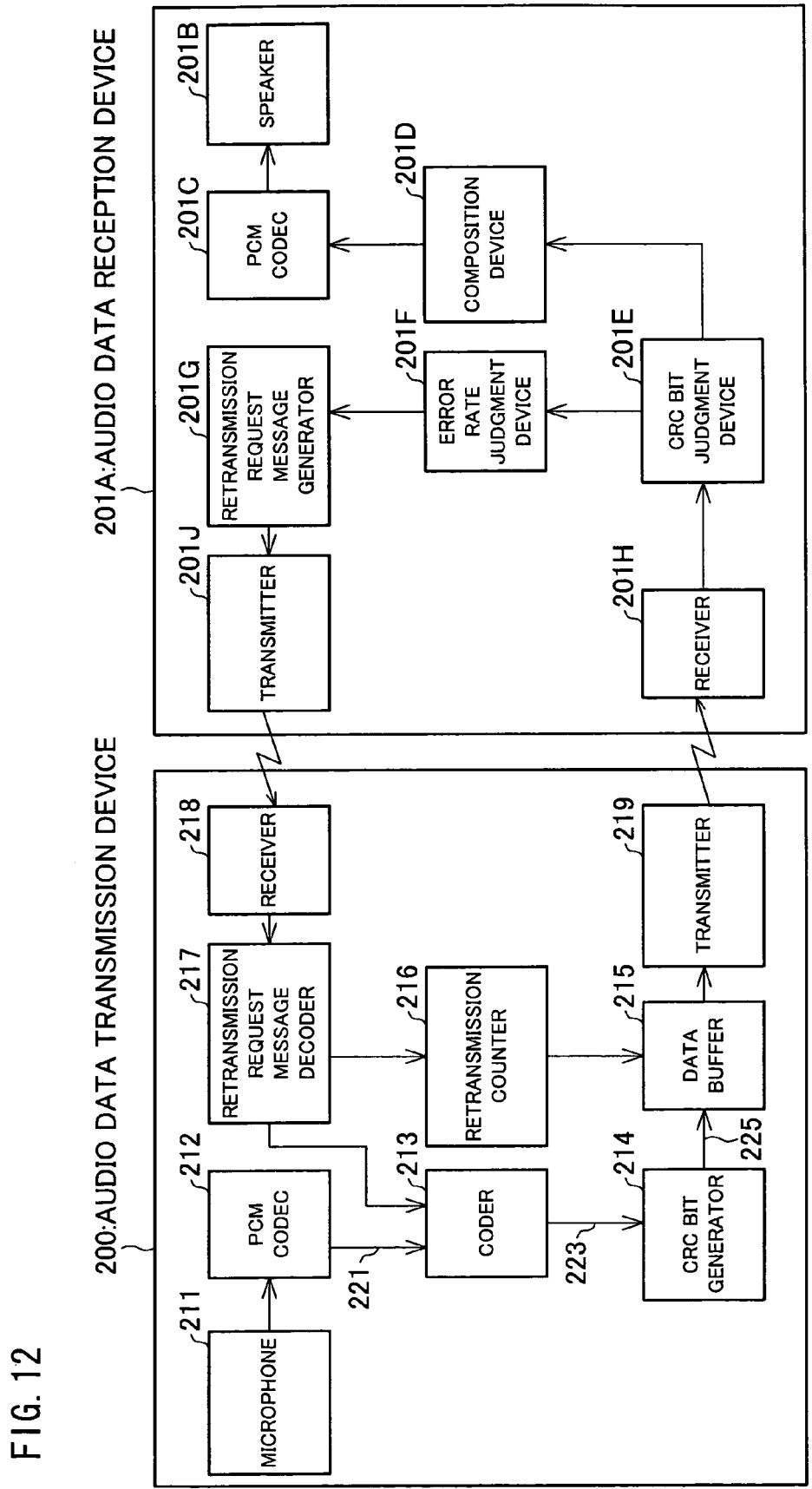
FIG. 12 illustrates an arrangement of a conventional audio data communication device.

FIG. 11 is a block diagram illustrating an arrangement of the TV main body 103 of the wireless AV system.

In FIG. 11, the TV main body 103 is arranged to include: the SS reception unit 161 (transmission means, reception means, first transmission means, first reception means) for transmitting/receiving a TV command so as to receive the MPEG-2 stream and the command transmission data transmitted from the SS transmission unit 136 of the wireless center 102, and decoding the received MPEG-2 stream and the like to the original data; a second selector 162 for selecting (i) the data decoded by the SS reception unit 161, or (ii) an AV signal externally inputted to the TV output/video 4 input terminal 121; a TV display section 163 constituted by, for example, a LCD for displaying a video signal and for outputting an audio signal; a TV microcomputer 164 for transmitting/receiving a TV command 171, and transmitting a source selection signal 172, an OSD (on screen display) 173 and the like, so as to control the whole device; an electrically erasable nonvolatile memory, EEPROM 165 for storing various kinds of data such as a control program for the TV microcomputer 164, communication control data, and a communication channel changing program; a remote controller light reception section 166 for receiving the control command from a remote control device (not shown); a battery 167; and a battery recharging microcomputer 168 for controlling charging/discharging of the battery 167.

The SS reception unit 161 is arranged to include: an SS radio reception engine 181 constituted by an SS radio apparatus for receiving data transmitted in the SS radio system and a radio control section and; an MPEG-2 decoder 182 for decoding the received MPEG-2 stream; a D/A converting section 183 for converting the decoded data into an analog signal; and a second SS-CPU 184 (communication state detection means, error judgment means, electric field intensity judgment means) for controlling-the SS radio reception engine 181, the MPEG-2 decoder 182, and the D/A converting section 183 in the SS reception unit, and for detecting a radio wave state.

The SS radio reception engine 181 has a reception function for receiving an MPEG-2 stream, a command, and the like from the SS transmission unit 136 in the wireless center 102, and a transmission function for transmitting a command and the like from the SS reception unit 161.

The TV microcomputer 164 has an OSD generation function section inside thereof, and displays information such as a channel, time, and volume on a screen of the TV or the like. For video devices such as TVs, and for electronics devices such as TV conference systems, information, such as a channel, time, and volume, is generally displayed on a TV screen. OSD data is not stored as an image but in a format called a bit map, and converted from the bit map into a pixel value in YUV format indicated by Y, Cb, Cr. The converted pixel is superimposed on an original image such as a TV broadcast. Moreover, by connecting an image player, such as a DVD player (not shown), to the TV output/video 4 input terminal 121, an OSD display superimposed on a playing image is possible on the display screen.

Moreover, a drawing is omitted but the TV main body 103 may be arranged to include: a speaker; a key input section; and a slot. Into/from the slot, a card type external extended memory medium is inserted or ejected. When the card type external extended memory medium is inserted into the slot, data is directly read out of the card type external extended memory medium. Examples of card type external extended memory media include compact flash (CP) (Registered trademark) constituted by an SRAM (Static RAM)card in which written information is stored by power source backup and flash memory in which power source backup is not necessary, smart media, memory stick, and super micro hard disc drive (HDD) which is as large as a compact flash or can be inserted into a PC card Type II.

The remote controller light reception section 166 is an optical communication port section using IR (Infrared Rays) and receives a light signal from the remote control device which performs various operations on the TV main body 103 or on the wireless center 102. Specifically, the remote controller right reception section 166 is an I/O port for performing optical communication according to a standard for transmitting data using infrared rays, i.e. IrDA (Infrared Data Association), to an ASK or the like. Alternatively, the remote controller light reception section 166 is a radio communication port using a radio wave.

The battery 167 supplies predetermined power to each section in the TV main body 103. When the battery 167 is ready to be charged, the battery charger microcomputer 168 detects that the TV main body 103 is mounted on the wireless center 102, other cradle, or the like, and performs charging/discharging control to a charge medium (not shown) of the battery 167 via an electric power supply terminal (not shown). Specifically the battery charger microcomputer 168 accumulates discharge electric current of a battery pack, and when it is judged that a remaining capacity of the battery pack is lower than a predetermined value, the battery charger microcomputer 168 starts charging. While charging, the battery charger microcomputer 168 accumulates charging electric current to the battery pack, and when it is judged that the battery pack is fully charged, the battery charger microcomputer 168 stops charging. The charged battery 167 serves as a main power source of a mobile TV when the TV main body 103 is detached from a commercial power source, and supplies electric power to each section in the main body.

As explained above, the wireless AV system 101 according to the present embodiment includes the wireless center 102 and the TV main body 103 for transmission/reception of image and audio data at a predetermined MPEG rate. The wireless center 102 has the wireless center microcomputer 137 for controlling the whole device, the EEPROM 138 for storing the predetermined MPEG rate, and the first SS-CPU 154 for detecting a communication state between the wireless center 102 and the TV main body 103, according to electric field intensity of the reception radio wave, and retransmission requirement based on an error rate. The wireless center microcomputer 137 controls, according to the detected communication state, setting the transmission rate of the video and audio data to be transmitted. In such a wireless AV system, when a communication state changes (especially deteriorates), different from conventional examples in which the bit rate is manually lowered by a user, or the bit rate is lowered by fixed bit rate, the bit rate is automatically set according to the AV data. Thus, even when the communication state deteriorates, it is possible to minimize deterioration of the video and audio data and ensure data transmission as much as possible for data such as news programs which require information communicability.

It is noted that the radio communication device, transmitter, receiver, radio communication system, and wireless AV system according to the present invention are not limited to the above mentioned embodiments. Of course, various modifications can be made without departing from the scope of the present invention. For example, although descriptions are given as to the case where the wireless AV equipment is a portable TV, the wireless AV device is not limited to a TV receiver but can be applied to a device having a radio communication function or a device having the radio communication function. An example of AV equipment, in addition to a VTR (Video Tape Recorder), is a record/play device for recording in HDD and DVD. Moreover, as a device which can perform data transmission/reception, the wireless AV device can be a device which is incorporated into information equipment represented by a personal computer, and is applicable to all systems. Moreover, transmission/reception data may have any contents.

Moreover, in the present embodiment, although descriptions are given as to a TV receiver, the present invention is not limited to this, and as described above, can be applied to a tuner and personal computer, and other AV equipment using a tuner.

Moreover, types of each processing section constituting the radio communication device, transmitter, receiver, wireless AV system, and types and format of the setting information are not limited to the described embodiment. Especially, the present invention is applied to equipment complying with HAVi very well.

Moreover, the AV data is transmitted as an MPEG stream complying with the MPEG-2 coding system. However, the data transmission can by applied to an MPEG stream based on another MPEG system, and to data transmission using means other than an MPEG stream. Moreover, content types and MPEG rates shown in FIG. 6 are examples, and not limited to this.

Moreover, names used in the present embodiment are radio communication device, radio communication system, wireless AV system and radio transmission method. However, these names are for convenience of description, and other names such as radio transmission equipment, AV data communication device, information communication method may be used.

The above described radio communication device, transmitter, receiver, and wireless AV system are also realized as a program stored in a computer readable recording medium, which when executed by the personal computer, performs the functions of the radio communication device, transmitter, receiver, and wireless AV system. In the present invention, the recording medium may be such that the main memory itself is a program medium. Moreover, the recording medium may be a program medium for which a program reading device is provided as an external memory device, and by inserting the recording medium, the data can be read out of the recording medium. In any case, the stored program may be executed when the CPU accesses the program, or, in any case, a program may be read out to be downloaded to the program memory area (not shown), and then the program may be executed. It is assumed that the program for download is previously stored in a main body device.

Here, the program medium is a recording medium which is removable from the main body, and may be a medium which non-transmissibly stores the program including a tape such as a magnetic tape, or a cassette tape; a magnetic disk such as a floppy (registered trademark) disk, or a hard disk; or an optical disc such as a CD-ROM, a MO, a MD, or a DVD; a card such as an IC card an optical card; or a semiconductor memory such as a mask ROM, EPROM, EEPROM, or flash ROM, etc.

Moreover, in the case where the device or the system has means (not shown) to connect to an external communication network, the program medium may be a medium which dynamically stores a program in such a way that the program is downloaded via the communication connection means from the communication network. In the case the program is downloaded via the communication network, it is preferable that the program for downloading is stored in the main body device in advance or may be installed from other recording media. Note that, content stored in the recording media is not limited to programs but may be data.

Substantially as described above, according to the present invention, during a radio transmission of image and audio at a fixed bit rate, when interference in the surrounding environment causes an error, and deterioration in the image and audio, a bit rate is temporarily lowered automatically and the maximum number of times of retransmission of the error data is increased, so that error tolerance is improved.

The present invention is not limited to the above mentioned embodiments, and various modifications may be made within the scope of the claims. An embodiment based on a proper combination of technical means disclosed in different embodiments is encompassed in the technical scope of the present invention.

Note that each section and each processing step of the radio communication device according to the embodiment can be realized such that computation means such as a CPU executes a program stored in memory means such as ROM (Read Only Memory) or RAM, to control input means such as a keyboard, output means such as a display, or communication means such as an interface circuit. Therefore, only reading the recording medium in which the program is recorded, and executing the program using a computer having the above mentioned means can realize the various types of functions and the various types of processes of the radio communication device according to the embodiments. Moreover, it is possible to realize the various types of functions and the various types of processes on any computer, by recording the program in a removable recording medium.

The recording medium may be a program medium such as a memory (not shown), i.e. ROM for processing in a microcomputer. Moreover, the recording medium may be a program medium for which a program read device is provided as an external memory device, and by inserting the recording medium, the data can be read out of the recording medium.

Moreover, in any case, the stored program is preferably executed when the microprocessor accesses the program. Moreover, it is preferable that a program is read out to be downloaded to the program memory area of the microcomputer, and then the program is executed. Note that the program for downloading is previously stored in the main body device.

Here, the program medium is a recording medium which is removable from the main body, and may be a medium which non-transmissibly stores the program including a tape such as a magnetic tape, or a cassette tape; a magnetic disk such as a floppy (registered trademark) disk, or a hard disk; or an optical disc such as a CD-ROM, a MO, a MD, or a DVD; a card such as an IC card (including memory cards) or an optical card; or a semiconductor memory such as a mask ROM, EPROM ( Erasable Programmable Read Only Memory), EEPROM (Electrically Erasable Programmable Read Only Memory), or flash ROM, etc.

Moreover, in case the system is configured to be connectible to a communication network including the Internet, the program medium is preferably a recording medium dynamically storing the program so that the program will be downloaded via the communication network.

In the case the program is downloaded via the communication networks, it is preferable that the program for downloading is stored in the main body device in advance or may be installed from other recording media.

Moreover, conventionally there are the following problems, and to solve the problems, an object of the present application may also be as follows.

In conventional radio communication equipment, variable bit rate compression methods are used. Therefore it is necessary to change a compression rate and number of times of retransmission according to an error rate in every data packet transmission. Moreover, the higher the error rate in the received data, the higher compression rate and number of times of retransmission are required. This may lead to an excessively high compression rate, resulting in deterioration of audio quality such that a majority of users cannot bear to listen to the audio. Moreover, when the compression method is applied to video transmission, the video deteriorates to a level at which a majority of users can not bear to watch the video.

The present invention is intended to solve the above mentioned problems and an object of the present invention is to provide a radio communication device, transmitter, receiver, radio communication system, wireless AV system, radio transmission method, operation control program, and recording medium containing the program, in which even when the communication state deteriorates, it is possible to minimize deterioration of the video and audio data, and improve error tolerance.

The radio communication device according to the present invention may be arranged as follows.

A radio communication device for transmission of data including video data and audio data at a predetermined bit rate, wherein the radio communication device comprises communication state detection means for detecting a communication state; setting value storing means for storing setting values which are respectively associated with transmission rates and numbers of times of retransmission; and transmission rate setting means for selecting, based on the detected communication state, a setting value stored in the setting value storing means, and for setting, based on the selected setting value, a transmission rate and number of times of retransmission. Moreover, the communication state detection means may detect the communication state, according to the electric field intensity of a reception radio wave, or an error rate, or a number of times of retransmission request based on the error rate.

The communication state detection means may be arranged such that it detects the communication state between radio communication devices to which a communication link is established.

The video and audio data may be transmitted as an MPEG stream complying with an MPEG coding system.

The transmitter according to the present invention may be arranged as follows.

A transmitter for transmission of data including video data and audio data at a predetermined bit rate, wherein the transmitter comprises reception means for receiving error information from a receiver to which data is to be transmitted; setting value storing means for storing setting values which are respectively associated with transmission rates and numbers of times of retransmission; transmission rate setting means for selecting, based on the transmitted error information, a setting value stored in the setting value storing means, and for setting, based on the selected setting value, a transmission rate and a number of times of retransmission; and transmission means for transmitting the video and audio data at the transmission rate and the number of times of retransmission according to the setting value.

The receiver according to the present invention may be arranged as follows.

A receiver for reception of video data and audio data transmitted at a predetermined bit rate may comprise reception means for receiving video and audio data; error judgment means for judging errors in the reception data; and transmission means for transmitting the judged error information to a transmitter from which data is to be transmitted.

The error judgment means may judge the electric field intensity of the reception data, and the transmission means may transmit the electric field intensity judged by the error judgment means as error information.

The radio communication system according to the present invention may be arranged as follows.

A radio communication system including a transmitter and a receiver for transmission/reception of data including video data and audio data at a predetermined bit rate, wherein the receiver comprises first reception means for receiving the video and audio data transmitted from the transmitter; error judgment means for judging errors in the reception data; first transmission means for transmitting the judged error information to the transmitter, and the transmitter comprises second reception means for receiving the error information transmitted from the receiver; setting value storing means for storing setting values which are respectively associated with transmission rates and numbers of times of retransmission; transmission rate setting means for selecting, based on the error information transmitted from the receiver, a setting value stored in the setting value storing means, and for setting, based on the selected setting value, a transmission rate and a number of times of retransmission; and second transmission means for transmitting video and audio data at the transmission rate and the number of times of retransmission based on the setting value.

A radio communication system including a transmitter and a receiver for transmission/reception of data including video data and audio data at a predetermined bit rate, wherein the receiver comprises first reception means for receiving the video and audio data transmitted from the transmitter; electric field intensity judgment means for judging electric field intensity of the reception data; and first transmission means for transmitting the judged electric field intensity as error information to the transmitter, and the transmitter comprises second reception means for receiving the error information transmitted from the receiver; setting value storing means for storing setting values which are respectively associated with transmission rates and numbers of times of retransmission; transmission rate setting means for selecting, based on the error information transmitted from the receiver, a setting value stored in the setting value storing means, and for setting, based on the selected setting value, the transmission rate and the number of times of retransmission; and second transmission means for transmitting the video and audio data at the transmission rate and the number of times of retransmission based on the setting value.

The transmission rate setting means may be arranged such that it lowers the transmission rate and increases the number of times of retransmission when the error is not corrected even if the data is retransmitted at the maximum number of times of retransmission.

The transmission rate setting means may be arranged such that it lowers the transmission bit rate and increases the number of times of retransmission when the electric field intensity detected at the reception end is lower than a predetermined level at which error often occurs.

The transmission rate setting means may be arranged such that it lowers transmission rate and increases the number of times of retransmission when the error rate of the data received at the reception end is at a predetermined level at which video and audio deteriorate.

The transmission rate setting means may be arranged such that it lowers the transmission rate directly to the lowest rank when the error rate detected at the reception end drastically increases and/or the electric field intensity drastically lowers.

The transmission rate setting means may be arranged such that the transmission rate setting means gradually lowers the transmission rate by a predetermined rank at a time, when the error rate detected at the reception end gradually increases and/or the electric field intensity gradually lowers.

The transmission rate setting means may be arranged such that it increases the transmission rate to the highest level, when the error rate detected at the reception end is at the non-interference level, and/or the electric field intensity is at the non-interference level.

The transmission rate setting means may be arranged such that it increases the transmission rate by a predetermined rank at a time, when the error rate detected at the reception end gradually lowers, and/or the electric field intensity gradually increases.

The radio transmission system may be applied to an AV system as follows.

A wireless AV system for connecting plural radio communication devices via a radio network, wherein the radio communication devices include the radio communication system as arranged above.

The radio communication system may be a television receiver constituted by a display device, and a center device having a broadcasting reception tuner, and transmitting video and audio data to the display device.

The radio transmission method according to the present invention may comprise the following steps.

A radio transmission method for transmission of data including video data and audio data at a predetermined bit rate, the radio transmission method comprising the steps of detecting a communication state; storing setting values which are respectively associated with transmission rates and numbers of times of retransmission; and selecting a setting value based on the detected communication state, and setting a transmission rate and a number of times of retransmission based on the selected setting value.

The control program according to the present invention may be arranged as follows.

A program in a radio transmission method for transmission of data including video data and audio data at a predetermined bit rate, wherein the program is for causing a computer to execute process steps of detecting a communication state; storing setting values which are respectively associated with transmission rates and numbers of times of retransmission; and selecting a setting value based on the detected communication state, and setting a transmission rate and a number of times of retransmission based on the selected setting value.

The recording medium according to the present invention may be arranged as follows.

A computer readable recording medium in a radio transmission method for transmission of data including video data and audio data at a predetermined bit rate, wherein in the computer readable recording medium, a program is stored for causing a computer to execute process steps of detecting a communication state; storing setting values which are respectively associated with transmission rates and numbers of times of retransmission; and selecting a setting value based on the detected communication state, and setting a transmission rate and a number of times of retransmission based on the selected setting value.

Substantially as described above, according to the present invention, during a radio transmission of images and audio at a fixed bit rate, when interference in the surrounding environment causes an error and deterioration in the image and audio, bit rate is temporarily lowered automatically and the maximum number of times of retransmission of the error data is increased, so that error tolerance is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The radio transmission device according to the present invention is suitable for an AV network system for domestic use, such as a display separation type wireless TV receiver for radio transmission of video and/or audio data. However, the present invention is not limited to this, and widely applicable to radio communication equipment such as mobile telephones/PHS (Personal Handy-Phone System) and Personal Digital Assistants (PDA).

The invention claimed is:

1. A radio communication device for transmission of data including video data and audio data at a predetermined bit rate, comprising:
   a communication state detection section for detecting a communication state, according to a signal from a sender; and
   a data transmission section for transmitting the data while controlling to change the bit rate according to the communication state detected by the communication state detection section, wherein unless the communication state detected by the communication state detection section satisfies a predetermined criterion, the data transmission section temporarily lowering the bit rate for transmitting the data, and then increases the bit rate at regular time intervals and increases the number of times of retransmission of data to a transmitter end.

2. The radio communication device according to claim 1, further comprising:
   a setting value storing section for storing setting values which are respectively associated with bit rates and numbers of times of retransmission of data,
   the data transmission section selecting, based on the detected communication state, a setting value stored in the setting value storing section, and transmitting the data at the bit rate and the number of times of retransmission corresponding to the selected setting value.

3. The radio communication device according to claim 2, wherein:
   the video data and audio data are transmitted as an MPEG stream complying with an MPEG (Motion Picture Experts Group) coding system.

4. The radio communication device according to claim 1, wherein:
   the video data and audio data are transmitted as an MPEG stream complying with an MPEG (Motion Picture Experts Group) coding system.

5. A wireless AV (audio visual) system for connecting plural radio communication devices via radio networks, wherein:
   the radio communication device is the radio communication device according to claim 1.

6. A non-transitory computer readable recording medium storing a control program for operating the radio communication device according to claim 1, wherein:
   the control program when executed causes a computer to serve as each section.

7. A radio transmission method in a radio communication device for transmission of data including video data and audio data at a predetermined bit rate, the radio communication device comprising a communication state detection section and a data transmission section, the radio transmission method comprising:
   a first step of detecting, by the communication state detection section, a communication state, according to a signal from a sender; and
   a second step of transmitting by the data transmission section, the data while controlling to change the bit rate, according to the communication state detected in the first step, wherein in the second step, unless the communication state satisfies a predetermined criterion, the bit rate is temporarily lowered, and then the bit rate is increased at regular time intervals and the number of times of retransmission of data to a transmitter end is increased for transmitting the data.

8. A radio communication system including a transmitter and a receiver for transmission/reception of data including video data and audio data at a predetermined bit rate,
   the receiver comprising:
   a communication state detection section for judging errors in the data received from the transmitter and detecting a communication state according to the judged result; and
   an error information transmission section for transmitting the communication state detected by the communication detection section as error information to the transmitter, and
   the transmitter comprising:
   a data transmission section for transmitting the data while controlling to change the bit rate according to the communication state detected by the communication state detection section, wherein unless the communication state detected by the communication state detection section satisfies a predetermined criterion, the data transmission section temporarily lowers the bit rate for transmitting the data, and then increases the bit rate at regular time intervals and increases the number of times of retransmission of data to a transmitter end.

* * * * *